US008094277B2

(12) United States Patent
Tasaka et al.

(10) Patent No.: US 8,094,277 B2
(45) Date of Patent: *Jan. 10, 2012

(54) LIQUID CRYSTAL DISPLAY DEVICE

(75) Inventors: Yasutoshi Tasaka, Tokyo (JP); Takahiro Sasaki, Mie (JP); Yohei Nakanishi, Tenri (JP); Masakazu Shibasaki, Mie (JP); Takashi Sasabayashi, Kanagawa (JP); Hidefumi Yoshida, Kanagawa (JP); Tsuyoshi Kamada, Kanagawa (JP); Hideaki Tsuda, Kanagawa (JP); Kazuya Ueda, Kanagawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/064,662

(22) Filed: Apr. 7, 2011
(Under 37 CFR 1.47)

(65) Prior Publication Data

US 2011/0187977 A1   Aug. 4, 2011

Related U.S. Application Data

(63) Continuation of application No. 12/654,802, filed on Jan. 5, 2010, now Pat. No. 7,944,534, which is a continuation of application No. 11/333,551, filed on Jan. 18, 2006, now Pat. No. 7,656,486.

(30) Foreign Application Priority Data

Jan. 19, 2005   (JP) .................................. 2005-011508

(51) Int. Cl.
*G02F 1/1343* (2006.01)

(52) U.S. Cl. ............ 349/129; 349/38; 349/39; 349/130; 349/144

(58) Field of Classification Search .................. 349/144, 349/129
See application file for complete search history.

(56) References Cited

U.S. PATENT DOCUMENTS

| 4,840,460 A | 6/1989 | Bernot et al. |
|---|---|---|
| 5,126,865 A | 6/1992 | Sarma |
| 5,309,264 A | 5/1994 | Lien et al. |
| 6,417,900 B1 | 7/2002 | Shin et al. |
| 6,724,452 B1 | 4/2004 | Takeda et al. |

(Continued)

FOREIGN PATENT DOCUMENTS

JP         02-000012 A     1/1990

(Continued)

OTHER PUBLICATIONS

U.S. Appl. No. 12/654,802, filed Jan. 5, 2010; Tasaka et al.

(Continued)

*Primary Examiner* — Richard Kim
(74) *Attorney, Agent, or Firm* — Nixon & Vanderhye P.C.

(57) ABSTRACT

The present invention provides a liquid crystal display device used as a display part of an electronic apparatus which exhibits high brightness and favorable display quality. The liquid crystal display device includes a pair of substrates which are arranged to face each other in an opposed manner; vertical-alignment type liquid crystal which is sealed between the pair of substrates; a plurality of pixel regions, each pixel region including a sub pixel having a pixel electrode on one substrate and a sub pixel having a pixel electrode on one substrate, a slit formed between the pixel electrodes; and a singular point control part which includes projecting portions which are formed on end portions of the pixel electrodes on the slit-side and controls singular points of the liquid crystal.

9 Claims, 21 Drawing Sheets

U.S. PATENT DOCUMENTS

| | | |
|---|---|---|
| 6,750,934 B2 | 6/2004 | Sakamoto et al. |
| 6,771,344 B2 | 8/2004 | Lyu et al. |
| 6,879,364 B1 | 4/2005 | Sasaki et al. |
| 6,937,311 B2 | 8/2005 | Song et al. |
| 7,304,703 B1 | 12/2007 | Takeda et al. |
| 7,656,486 B2 | 2/2010 | Tasaka et al. |
| 7,944,534 B2 | 5/2011 | Tasaka et al. |
| 2001/0020992 A1 | 9/2001 | Takeda et al. |
| 2004/0070715 A1 | 4/2004 | Ma et al. |
| 2004/0135147 A1 | 7/2004 | Kim et al. |
| 2004/0207788 A1 | 10/2004 | Yamaguchi et al. |
| 2005/0078263 A1* | 4/2005 | Kim et al. .................... 349/144 |
| 2006/0103800 A1 | 5/2006 | Li et al. |

FOREIGN PATENT DOCUMENTS

| | | |
|---|---|---|
| JP | 3076938 B2 | 6/2000 |
| JP | 2001-249340 | 9/2001 |
| JP | 2004-213011 | 7/2004 |
| JP | 2004-240419 | 8/2004 |

OTHER PUBLICATIONS

U.S. Appl. No. 11/333,546, filed Jan. 18, 2006; Tasaka et al.

\* cited by examiner

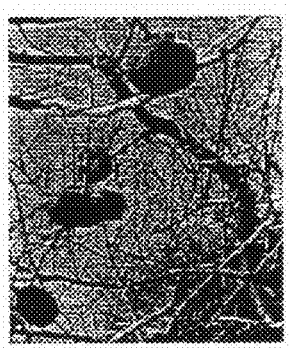
FIG. 24A
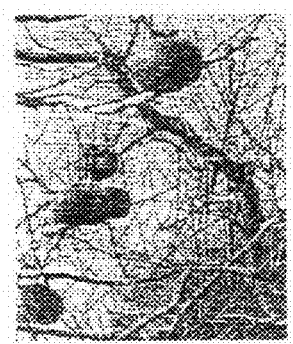
FIG. 24B
FIG. 25A
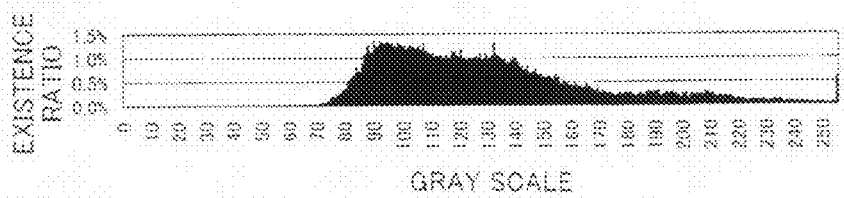
FIG. 25B
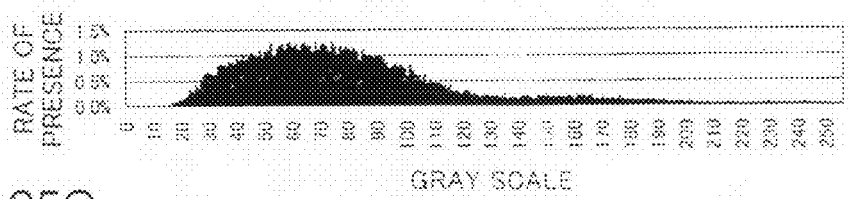
FIG. 25C
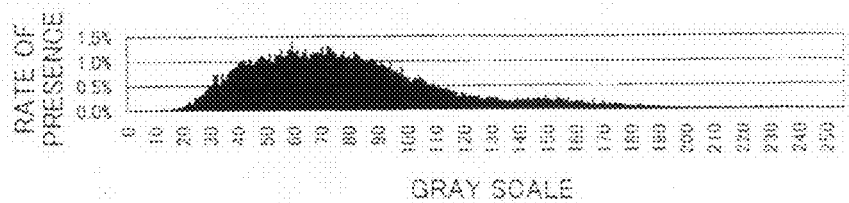

LIQUID CRYSTAL DISPLAY DEVICE

This application is a Continuation of Application Ser. No. 12/654,802, filed Jan. 5, 2010 now U.S. Pat. No. 7,944,534, which is a Continuation of Application Ser. No. 11/333,551, filed Jan. 18, 2006, (now U.S. Pat. No. 7,656,486), the entire contents of which are all hereby incorporated herein by reference in this application.

BACKGROUND OF THE INVENTION

1. Field of the Invention

The present invention relates to a liquid crystal display device used in a display part of an electronic apparatus or the like.

2. Description of the related art

FIG. 13 shows the schematic cross-sectional constitution of a conventional liquid crystal display device. As shown in FIG. 13, the liquid crystal display device includes a TFT substrate 102 on which a thin film transistor (TFT) and a pixel electrode are formed for every pixel, and a counter substrate 104 on which color filters (CF) and a common electrode are formed. Both substrates 102, 104 are laminated to each other through a sealing material 152 which is applied to outer peripheral portions of both substrates 102, 104. A mounting terminal 160 which serves to mount a driver IC is formed on the TFT substrate 102. Liquid crystal 106 is sealed between both substrates 102, 104. A cell gap defined between both substrates 102, 104 is held by spherical spacers 146, for example. Further, polarizers 187, 186 are arranged on the outsides which sandwich both substrates 102, 104 therebetween.

FIG. 14 shows the constitution of one pixel of a conventional MVA (Multi-domain Vertical Alignment) type liquid crystal display device. As shown in FIG. 14, the liquid crystal display device includes a plurality of gate bus lines 112 which are formed on the TFT substrate 102, and a plurality of drain bus lines 114 which intersect the gate bus lines 112 through an insulation film. TFTs 120 are formed in the vicinity of positions where the gate bus lines 112 and the drain bus lines 114 intersect each other. In a pixel region which is defined by the gate bus lines 112 and the drain bus lines 114, a pixel electrode 116 is formed. A storage capacitor bus line 118 which extends parallel to the gate bus line 112 is formed in a state that the storage capacitor bus line 118 transverses the pixel region. A storage capacitor electrode 119 is formed over the storage capacitor bus line 118 through an insulation film for every pixel. A linear slit (blank on an electrode) 144 which extends obliquely with respect to polarization axes of the polarizers 186, 187 is formed on the pixel electrode 116. On the counter substrate 104 side, linear projections 142 which extend parallel to the slit 144 are formed. The slit 144 and the linear projections 142 function as the alignment regulating structure which regulates the alignment of the liquid crystal 106.

FIG. 15A and FIG. 15B are cross-sectional views for explaining the alignment regulating structure. In FIG. 15A and FIG. 15B, linear projections 143 are formed on the substrate 102, while the linear projections 142 are formed on the substrate 104. As shown in FIG. 15A, the linear projections 143 on the. TFT substrate 102 side are formed on an alignment film 150 which is formed on the pixel electrode 116, for example. The linear projections 142 of the counter substrate 104 side are formed on an alignment film 151 which is formed on a common electrode 141, for example. At the time of applying no voltage, liquid crystal molecules 108 are aligned substantially normal to surfaces of the substrates. When a voltage is applied between the pixel electrode 116 and the counter electrode 141, as shown in FIG. 15B, the liquid crystal molecules 108 are tilted. Using the linear projections 142, 143 as boundaries, the direction that the liquid crystal molecules 108 are tilted differs and the liquid crystal molecules 108 in a region between the neighboring linear projections 142, 143 are tilted in the same direction. By arranging the alignment regulating structure as shown in FIG. 14, the liquid crystal molecules 108 are tilted in four directions orthogonal to each other in the inside of one pixel. Due to such an alignment division technique, the deviation of a viewing angle which is a phenomenon generated in the liquid crystal display device in which the liquid crystal molecules 108 are tilted only in one direction can be eliminated thus largely improving the viewing angle characteristics. Here, in the constitution shown in FIG. 15A and FIG. 15B, the linear projections 142, 143 are formed on both substrates 102, 104 as the alignment regulating structure. However, there may be a case that the linear projections are formed on only one of the substrates 102, 104. Further, there may be a case that slits are formed on both substrates 102, 104 in place of the linear projections 142, 143. Still further, there may be case that slits 145 are formed only one of substrates 102, 104 as shown in FIG. 16.

FIG. 17 shows one pixel of a general MVA type liquid crystal display device in which slits 144 are formed in a TFT substrate 102 side and linear projections 142 are formed on the counter substrate 104 side. FIG. 18 shows the cross-sectional constitution of the liquid crystal display device taken along a line X-X in FIG. 17, while FIG. 19 shows the cross-sectional constitution of a TFT substrate 102 taken along a line Y-Y in FIG. 17. As shown in FIG. 17 to FIG. 19, a pixel electrode 116 is divided into several regions by slits 144, and the respective regions of the pixel electrode 116 in the inside of the pixel are electrically connected with each other thus maintaining the respective regions at the same potential. The pixel electrode 116 is connected with a source electrode 122 of a TFT 120 via a contact hole 123 and also is electrically connected with a storage capacitor electrode 119 via a contact hole 126. A drain electrode 121 of the TFT 120 is electrically connected with a drain bus line 114. Due to the formation of the slits 144 and linear projections 142, the pixel region is divided into four alignment regions α to δ which differ from each other in the alignment azimuth of liquid crystal molecules 108.

FIG. 20 schematically shows the alignment azimuths of the liquid crystal molecules 108 in the respective alignment regions α to δ and an area ratio of the respective alignment regions in the inside of one pixel. As shown in FIG. 20, areas of the respective alignment regions α to δ which differ in the alignment azimuth of the liquid crystal molecules 108 from each other are set substantially equal in the inside of one pixel. Accordingly, the viewing angle characteristics of the liquid crystal display device do not posses the large dependency on an azimuth angle of a display screen and hence, a favorable display is obtained from any azimuth.

FIG. 21 shows the constitution of one pixel of a liquid crystal display device in which the arrangement of the slits 144 and the linear projections 142 is exchanged with respect to the constitution shown in FIG. 17 to FIG. 19. FIG. 22 shows the cross-sectional constitution of the liquid crystal display device taken along a line Z-Z in FIG. 21. Also in the liquid crystal display device shown in FIG. 21 to FIG. 22, the areas of the alignment regions α to δ are set substantially equal in the inside of one pixel. Accordingly, in the same manner as the liquid crystal display device shown in FIG. 17 to FIG. 19, it is possible to obtain a favorable display from any azimuth.

FIG. 23 is a graph showing the transmissivity characteristics (T-V characteristics) with respect to an applied voltage of a liquid crystal display device adopting a VA (vertically aligned) mode. The applied voltage (V) to a liquid crystal layer is taken on an axis of abscissas and the transmissivity of light is taken on an axis of ordinates. A line L indicates the T-V characteristics in the direction normal to a display screen (hereinafter referred to as "front direction"), and a line M indicates the T-V characteristics in the direction of an azimuth angle of 90° and a polar angle of 60° with respect to the display screen (hereinafter referred to as "tilted direction"). Here, the azimuth angle is an angle which is measured in the counter clock direction using the right direction of the display screen as the difference. Further, the polar angle is an angle which is made with a perpendicular which is erected on the center of the display screen.

As shown in FIG. 23, in the vicinity of a region surrounded by a circle N, a distortion is generated in the change of the transmissivity (brightness). For example, although the transmissivity in the oblique direction is higher than the transmissivity in the front direction at a relatively low gray scale with the applied voltage of approximately 2.5 V, the transmissivity in the tilted direction is lower than the transmissivity in the front direction at a relatively high gray scale with the applied voltage of approximately 3.8 V. As a result, when viewed from the tilted direction, the brightness difference within an effective drive voltage range becomes small. This phenomenon appears most conspicuously in the color change.

FIG. 24A and FIG. 24B show the change of appearance of an image displayed on a display screen. FIG. 24A shows the image as viewed from the front direction, and FIG. 24B shows the image as viewed from the tilted direction. As shown in FIG. 24A and FIG. 24B, when the display screen is viewed from the tilted direction, the color of the image is changed to a whitish color compared to the viewing from the front direction.

FIG. 25A to FIG. 25C show gray scale histograms of three primary colors of red (R), green (G), blue (B) in a reddish image. FIG. 25A shows the gray scale histogram of R, FIG. 25B shows the gray scale histogram of G, and FIG. 25C shows the gray scale histogram of B. In FIG. 25A to FIG. 25C, the gray scales (256 gray scales from 0 to 255) are taken on an axis of abscissas and an existence ratio (%) is taken on an axis of ordinates. As shown in FIG. 25A to FIG. 25C, in the image, R at the relatively high gray scale and G and B at the relatively low gray scales exist at high existence ratios. When such an image is displayed on a display screen of a liquid crystal display device adopting a VA mode and is observed from the tilted direction, R of high gray scale is changed in a relatively dark mode, while G and B of low gray scales are changed in the relatively bright mode. Accordingly, the brightness difference of three primary colors becomes small and hence, the color of the whole screen becomes whitish as viewed from the tilted direction thus giving rise to a drawback that the color reproducibility is lowered.

To overcome the above-mentioned drawback, there has been proposed a following technique. That is, one pixel is divided into a plurality of sub pixels and pixel electrodes which are separated from each other are provided to the respective sub pixels. The respective pixel electrodes establish the electrically capacitive coupling relationship. For example, the pixel electrode of the sub pixel A is directly connected to a source electrode of a TFT, and the pixel electrode of the sub pixel B is connected to the source electrode via a predetermined control capacitance Cc. When the TFT which is formed for every pixel assumes an ON state, a potential is divided according to the capacitance ratio and hence, voltages which differ from each other are applied to the pixel electrodes of the respective sub pixels. Accordingly, the voltage is applied to the liquid crystal layer for every sub pixel. In this manner, when the plurality of sub pixels which differ in the voltage applied to the liquid crystal layer are present in the inside of one pixel, the distortion of the T-V characteristics shown in FIG. 23 is dispersed into the plurality of sub pixels. Accordingly, it is possible to suppress the phenomenon that the image becomes whitish as viewed from the tilted direction and hence, the viewing angle characteristics are improved. Hereinafter, the above-mentioned technique is referred to as a capacitive coupling HT (halftone-gray scale) method.

FIG. 26 shows the constitution of one pixel of a conventional MVA type liquid crystal display device which uses the capacitive coupling HT method. As shown in FIG. 26, a pixel region includes a sub pixel A and a sub pixel B. In the sub pixel A, a pixel electrode 116 is formed on a TFT substrate 102, while in the sub pixel B, a pixel electrode 117 which is separated from the pixel electrode 116 is formed on the TFT substrate 102. The pixel electrode 116 is electrically connected with a storage capacitor electrode 119 and a source electrode 122 of a TFT 120 via contact hole 124. On the other hand, the pixel electrode 117 assumes an electrically floating state. The source electrode 122 is electrically connected with the storage capacitor electrode 119 via a control capacitance electrode 125. The pixel electrode 117 has a region which is overlapped to the control capacitance electrode 125 through a protective film (insulation film) and is indirectly connected with the source electrode 122 by capacitive coupling via a control capacitance Cc which is formed in the region.

Between the pixel electrodes 116, 117, a slit 144 which extends obliquely with respect to an end portion of the pixel region is formed. The slit 144 separates the pixel electrodes 116, 117 from each other and, at the same time, also functions as the alignment regulating structure which regulates the alignment of liquid crystal 106.

A counter substrate 104 which is arranged to face. the TFT substrate 102 in an opposed manner with a liquid crystal layer therebetween includes a common electrode 141(not shown in FIG. 26). A liquid crystal capacitance Clc1 is formed between the pixel electrode 116 of the sub pixel A and the common electrode 141, while a liquid crystal capacitance Clc2 is formed between the pixel electrode 117 of the sub pixel B and the common electrode 141. On the common electrode 141, a linear projection 142 which extends parallel to the slit 144 and functions as the alignment regulating structure is formed. The control capacitance electrode 125 on the TFT substrate 102 side is arranged to be overlapped to the linear projection 142 as viewed in the direction normal to surfaces of the substrates. Further, on the counter substrate 104, a light shielding film (BM) 145 which shields a pixel region end portion from light is formed.

Assume that the TFT 120 is turned on so that a voltage is applied to the pixel electrode 116 and a voltage Vpx1 is applied to the liquid crystal layer of the sub pixel A. Here, since the potential is divided in accordance with the capacitance ratio between the liquid crystal capacitance Clc2 and a control capacitance Cc, a voltage which is different from a voltage applied to the pixel electrode 116 is applied to the pixel electrode 117 of the sub pixel B. A voltage Vpx2 which is applied to the liquid crystal layer of the sub pixel B is expressed as follows.

$$Vpx2 = (Cc/(Clc2+Cc)) \times Vpx1$$

Here, since a relationship $0 < (Cc/(Clc2+Cc)) < 1$ is established, a relationship $|Vpx2| < |Vpx1|$ is established except for Vpx1=Vpx2=0, In this manner, in the liquid crystal display device having the pixel structure shown in FIG. 26, it is possible to make the voltage Vpx1 applied to the liquid crystal layer in the sub pixel A and the voltage Vpx2 applied to the liquid crystal layer in the sub pixel B different from each other in the inside of one pixel and hence, the viewing angle characteristics can be improved.

FIG. 27 shows the constitutions of the pixel electrodes 116, 117 in the vicinity of the slit 144. FIG. 28 shows a display state of the same region as FIG. 27 when the pixel is displayed in white. In FIG. 28, an example of polarization axes 186a, 187a of polarizers 186, 187 is shown together with a region. FIG. 29 schematically shows the alignment of liquid crystal molecules 108 in a region inside a circle P in FIG. 28. As shown in FIG. 27 to FIG. 29, the liquid crystal molecules 108a to which a voltage is applied are respectively tilted normal to the extending direction of the slit 144 and, at the same time, in the directions opposite from each other using the slit 144 (and the linear projection 142) as a boundary. However, although the liquid crystal molecules 108b, 108c in the region above the slit 144 are tilted parallel to the direction that the slit 144 extends, the liquid crystal molecules 108b, 108c are not regulated with respect to the side to which they are tilted. In the region above the slit 144, the liquid crystal molecules 108b which are tilted downwardly in FIG. 29 and the liquid crystal molecules 108c which are tilted upwardly exist and hence, nodes (singular points) 162a, 162b of the liquid crystal alignment are formed. The singular points 162a, 162b are formed at random positions above the slits 144 and hence, the control of the formation positions is difficult. Further, there may be a case that the singular points 162a, 162b are moved along with a lapse of time. Since the spatial and long-period fixing of the formation positions of the singular points 162a, 162b is difficult, after a black display is performed, there may be a case in which the formation positions of the singular points 162a, 162b differ between a state in which white is displayed through an intermediate gray scale display and a state in which white is displayed immediately after the black display. That is, even these white displays are the same, they pass through the different voltage applying histories and hence, they differ in the positions of the singular points 162a, 162b whereby the display becomes different depending on the viewing direction of the screen. Further, when a pressure is locally applied to the display screen with finger pushing or the like and the alignment of the liquid crystal is disturbed, there may be a case that an original alignment state cannot be restored. In this manner, the conventional liquid crystal display device has a drawback that a favorable display quality can not be achieved.

Here, between a drain bus line 114 and the pixel electrodes 116, 117, a given electric capacitance is formed. In the constitution in which an overcoat layer having a large film thickness is not formed as a layer between the drain bus line 114 and the pixel electrodes 116, 117, due to the difference in distance within a substrate plane between the drain bus line 114 and the pixel electrodes 116, 117, a value of the formed electric capacitance is liable to be easily changed. Accordingly, when a relative patterning displacement is generated with respect to the drain bus line 114 and the pixel electrodes 116, 117 due to shot irregularities which occur when the division exposure is performed or the like, for example, in the manufactured liquid crystal display device, the display irregularities which differ in display characteristics for every division exposure region are observed with naked eyes. Accordingly, it is necessary to separate end portions of the pixel electrodes 116, 117 from the drain bus line 114 as much as possible so as to make the difference in display characteristics hardly visible even when the patterning displacement occurs. However, when the end portions of the pixel electrodes 116, 117 are separated from the drain bus line 114, regions where the pixel electrodes 116, 117 are formed become narrow and hence, an aperture ratio of the pixel is lowered thus giving rise to a drawback that the brightness is lowered.

Further, in laminating the TFT substrate 102 and the counter substrate 104 to each other, there may arise a given lamination displacement. Accordingly, it is necessary to make an opening region of a BM 145 formed on the counter substrate side narrower than the regions where the pixel electrodes 116, 117 are formed on the TFT substrate 102 side. Accordingly, there arises a drawback that the aperture ratio of the pixels and the brightness are further lowered.

[Patent document 1] Japanese Patent Laid-open Publication H-2(1990)-12
[Patent document 2] U.S. Pat. No. 4,840,460
[Patent document 3] Japanese Patent Publication 3076938

SUMMARY OF THE INVENTION

It is an object of the present invention to provide a liquid crystal display device which exhibits high brightness and favorable display quality.

The above-mentioned object can be achieved by a liquid crystal display device which includes a pair of substrates which are arranged to face each other in an opposed manner, vertical-alignment type liquid crystal which is sealed between the pair of substrates, a plurality of pixel regions each of which includes a first sub pixel having a first pixel electrode which is formed on one substrate, and a second sub pixel having a second pixel electrode which is formed on one substrate, a slit which is formed between the first and the second pixel electrodes, and a projecting portion or a recessed portion which is formed on an end portion of the first or second pixel electrode on the slit side, wherein the liquid crystal display device further includes a singular point control part which controls singular points of the liquid crystal.

According to the present invention, it is possible to provide a liquid crystal display device which exhibits high brightness and favorable display quality.

BRIEF DESCRIPTION OF THE DRAWING

FIG. 24A and FIG. 24B are views showing the change of appearance of an image displayed on a display screen;

FIG. 25A to FIG. 25C are views showing gray scale histograms of R, G, B of a reddish image;

DESCRIPTION OF PREFERRED EMBODIMENTS

First Embodiment

Figure 1:
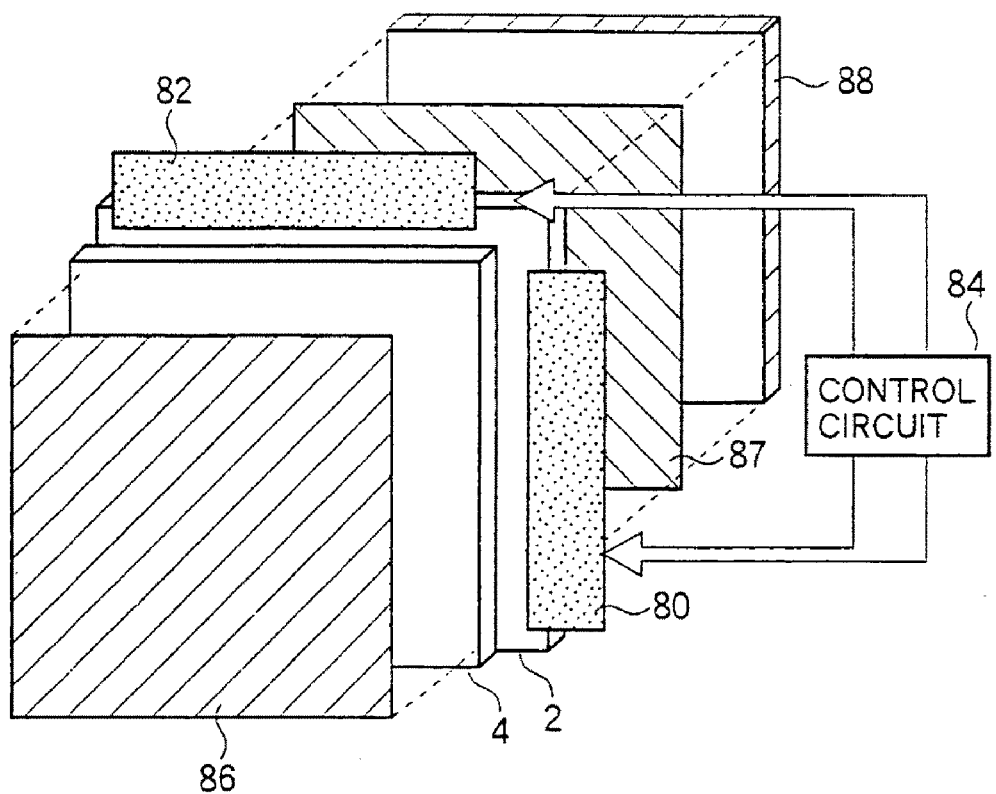
FIG. 1 is a view showing the schematic constitution of a liquid crystal display device according to a first embodiment of the present invention.

A liquid crystal display device according to a first embodiment of the present invention is explained using FIG. 1 to FIG. 8F. As shown in FIG. 1, the liquid crystal display device includes a TFT substrate 2 which is provided with gate bus lines and drain bus lines which are formed in an intersecting manner to each other through an insulation film, and a TFT and a pixel electrode which are formed for every pixel. Further, the liquid crystal display device includes a counter substrate 4 which is arranged to face the TFT substrate 2 in an opposed manner and on which CFs and a counter electrode are formed, and vertical-alignment-type liquid crystal which is sealed between both substrates 2, 4 and possesses negative dielectric anisotropy (not shown in the drawing), for example. On interfaces of the TFT substrate 2 and the counter substrate 4 with the liquid crystal, vertical alignment films (not shown in the drawing) which align the liquid crystal vertically are formed.

To the TFT substrate 2, a gate bus line drive circuit 80 on which a driver IC for driving a plurality of gate bus lines is mounted and a drain bus line drive circuit 82 on which a driver IC which drives the plurality of drain bus lines is mounted are connected. These drive circuits 80, 82 are configured to output scanning signals and data signals to given gate bus lines or given drain bus lines in response to given signals outputted from a control circuit 84. A polarizer 87 is arranged on a surface opposite to a TFT element forming surface of the TFT substrate 2, while a polarizer 86 which is arranged in a cross-nicol state with respect to the polarizer 87 is arranged on a surface of the counter substrate 4 opposite to a surface on which the common electrode is formed. On a surface of the polarizer 87 opposite to the TFT substrate 2, a backlight unit 88 is arranged.

Figure 2:
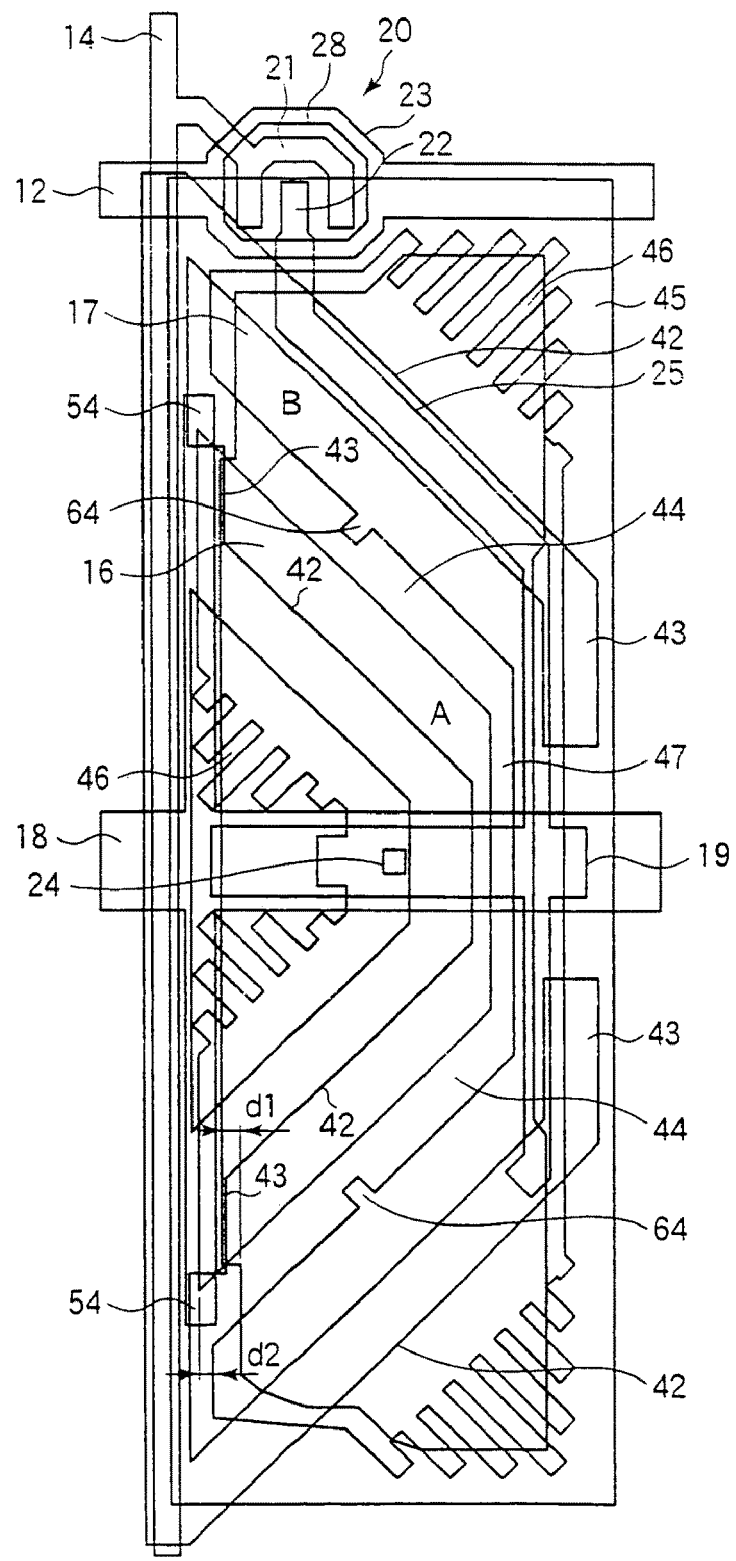
FIG. 2 is a view showing the constitution of one pixel of the liquid crystal display device according to the first embodiment of the present invention.

FIG. 2 shows the constitution of one pixel of an MVA type liquid crystal display device which uses a capacitive coupling HT method as the liquid crystal display device according to this embodiment. As shown in FIG. 2, a TFT substrate 2 of the liquid crystal display device includes a plurality of gate bus lines 12 which extend in the lateral direction in FIG. 2 and a plurality of drain bus lines 14 which extend in the vertical direction in FIG. 2 and which are formed in an intersecting manner through an insulation film (not shown in the drawing). In the vicinity of positions where the gate bus lines 12 and the drain bus lines 14 intersect each other, TFTs 20 which are formed for respective pixels as switching elements are arranged. A gate electrode 23 of the TFT 20 is electrically connected with the gate bus line 12. An operational semiconductor layer (not shown in the drawing) is formed on the gate electrode 23, while a channel protective film 28 is formed on the operational semiconductor layer. On the channel protective film 28, a rod-like source electrode 22 and a C-shaped drain electrode 21 which surrounds the source electrode 22 through a given gap are formed. The drain electrode 21 is electrically connected to the drain bus line 14. A protective film not shown in the drawing is formed over the whole substrate plane in a state that the protective film also covers the source electrodes 22 and the drain electrodes 21.

Further, a storage capacitor bus line 18 which extends in parallel to the gate bus line 12 is formed in a state that the storage capacitor bus line 18 traverses the pixel region defined by the gate bus lines 12 and the drain bus lines 14. A storage capacitor electrode 19 is formed on the storage capacitor bus line 18 through an insulation film for every pixel. The storage capacitor electrode 19 is electrically connected with the source electrode 22 of the TFT 20 through a control capacitive electrode 25. Between the storage capacitor bus line 18 and the storage capacitor electrode 19, a storage capacitor Cs is formed.

The pixel region includes a sub pixel A and a sub pixel B. The sub pixel A has a trapezoidal shape, for example, and is arranged in a center portion of the pixel region on a left side. The sub pixel B is arranged in an upper portion, a lower portion and a right-side end portion of a center portion in FIG. 2 excluding a region of the sub pixel A out of the pixel region. The arrangement of the sub pixels A, B assumes a substantially line symmetry within one pixel with respect to the storage capacitor bus line 18. A pixel electrode 16 is formed on the TFT substrate 2 in the sub pixel A, while a pixel electrode 17 which is separated from the pixel electrode 16 is formed on the TFT substrate 2 in the sub pixel B. The pixel electrodes 16, 17 are formed of a transparent conductive film, for example, and are formed on the same layer. The pixel electrode 16 is electrically connected with the storage capacitor electrode 19 and the source electrode 22 of the TFT 20 via a contact hole 24 formed in a protective film which is formed on the storage capacitor electrode 19. On the other hand, the pixel electrode 17 is held in an electrically floating state. The pixel electrode 17 includes a region which faces the control capacitive electrode 25 through a protective film in the upper portion of the pixel region in FIG. 2. The pixel electrode 17 is indirectly connected with the source electrode 22 due to a capacitive coupling through a control capacitance Cc of a control capacitance part formed in the region.

The pixel electrodes 16, 17 are separated from each other by slits 44, 47, 44 which surround three sides of the trapezoidal pixel electrode 16 in an L shape. The slits 44 extend obliquely with respect to an end portion of the pixel region, while the slit 47 extends along a right-side end portion of the pixel region. The slits 44 also function as the alignment regulating structure which regulates the alignment of the liquid crystal. On an end portion of the pixel electrode 17 on the slit 44 side, projecting portions 64 which project in a rectangular shape from the pixel electrode 17 in a substrate plane are formed as a singular point control part which controls the positions of singular points in the region above the slit 44. Distal ends of the projecting portions 64 face an end portion of the pixel electrode 16 with a given gap therebetween. The projecting portions 64 are arranged, for example, in the vicinity of the center portion of respective slits 44 in the longitudinal direction one by one, for example.

The counter substrate 4 which is arranged to face the TFT substrate 2 in an opposed manner with a liquid crystal layer therebetween includes a common electrode not shown in the drawing which is formed over the substantially whole area of the display region. A liquid crystal capacitance Clc1 is formed between the pixel electrode 16 in the sub pixel A and the common electrode which face each other with the liquid crystal layer therebetween. In the same manner, a liquid crystal capacitance Clc2 is formed between the pixel electrode 17 in the sub pixel B and the common electrode. On the common electrode, a linear projection 42 which extends in parallel to the slit 44 and obliquely with respect to the end portion of the pixel region and functions as the alignment regulating structure is formed. The slit 44 and the linear projection 42 extend in the direction which makes an angle of approximately 45° with respect to polarization axes of polarizers 86, 87 which are arranged outside in a state that the polarizers 86, 87 sandwich the TFT substrate 2 and the counter substrate 4. The linear projection 42 is formed of a positive resist material such as a novorac resin. The linear projections 42 are arranged in substantially center portions of the sub pixels A, B respectively so as to uniformly divide the region which differs in the alignment azimuth of the liquid crystal in the sub pixels A, B. Further, the linear projection 42 is arranged in the substantially line symmetry in one pixel with respect to the storage capacitor bus line 18. Due to such a constitution, the liquid crystal in the sub pixels A and B is substantially uniformly aligned in the our directions orthogonal to each other within one pixel. The control capacitive electrode 25 which connects the source electrode 22 and the storage capacitor electrode 19 is arranged on a substrate plane in a state that the control capacitive electrode 25 is overlapped to the linear projection 42 as viewed vertically. Here, with respect to the pixel electrodes 16, 17, since the defective alignment of the liquid crystal is liable to easily occur in a region relatively remote from the linear projection 42 in distance, fine slits 46 which extend substantially normal to the direction that the linear projection 42 extends are formed in the pixel electrodes 16, 17 in the region. Since the liquid crystal is aligned in parallel to the direction that the fine slits 46 extend, the defective alignment of the liquid crystal can be suppressed.

Further, in regions which are arranged in the vicinity of regions where the linear projection 42 and the end portions of the pixel electrodes 16, 17 intersect and where the extending direction of the linear projection 42 as viewed normal to the substrate plane and the end portions of the pixel electrodes 16, 17 make an obtuse angle, auxiliary projections 43 are formed. The auxiliary projections 43 are formed on the same layer as the linear projection 42, for example, and extend substantially parallel to the drain bus line 14. The auxiliary projections 43 are provided for canceling the influence of an electric field in the vicinity of the end portions of the pixel electrodes 16, 17 and are arranged on the end portions of the pixel electrodes 16, 17 in an overlapped manner as viewed normal to the substrate surface. Further, on the counter substrate 4, a BM 45 which shields the image region end portions from light is formed.

Assume that the TFT 20 is turned on so that a voltage is applied to the pixel electrode 16 and a voltage Vpx1 is applied to the liquid crystal layer of the sub pixel A. Here, since the potential is divided in accordance with the capacitance ratio between the liquid crystal capacitance Clc2 and the control capacitance Cc, a voltage which is different from a voltage applied to the pixel electrode 16 is applied to the pixel electrode 17 of the sub pixel B. A voltage Vpx2 which is applied to the liquid crystal layer of the sub pixel B is expressed as follows.

$$Vpx2 = (Cc/(Clc2+Cc)) \times Vpx1$$

Here, since a relationship $0 < (Cc/(Clc2+Cc)) < 1$ is established, the voltage Vpx2 becomes smaller than the voltage Vpx1 ($|Vpx2| < |Vpx1|$) except for Vpx1=Vpx2=0. In this manner, in the liquid crystal display device according to this embodiment, it is possible to make the voltage Vpx1 applied to the liquid crystal layer in the sub pixel A and the voltage Vpx2 applied to the liquid crystal layer in the sub pixel B different from each other in the inside of one pixel. Accordingly, the distortion of the T-V characteristics can be dispersed in one pixel and hence, a phenomenon that the color of the image as viewed from the oblique direction becomes whitish can be suppressed thus realizing the acquisition of the liquid crystal display device of a wide viewing angle which can improve the viewing angle characteristics.

Further, in this embodiment, in the vicinity of an end portion of the pixel electrode 16 which faces the drain bus line 14 (a left-side end portion in FIG. 2), a light shielding plate 54 which extends along the end portion is formed. The light shielding plate 54 has a function of shielding the vicinity of the end portion from the light. Further, the light shielding plate 54 is formed on the same layer as the storage capacitor bus line and is electrically connected with the storage capacitor bus line 18. For example, the light shielding plate 54 is branched from the storage capacitor bus line 18. Accordingly, the light shielding plate 54 is held at the same potential (common potential) as the storage capacitor bus line 18 and the common electrode and hence, a voltage is not applied to the liquid crystal layer in the vicinity of the region where the light shielding plate 54 is formed whereby the occurrence of leaking of light or the like can be suppressed in the normally black-mode liquid crystal display device.

Since the light shielding plate 54 is formed on the TFT substrate 2 side, it is unnecessary to take the lamination displacement into consideration. Accordingly, it is possible to arrange the light shielding plate 54 outside the BM 45 as viewed normal to the substrate plane and, at the same time, in the region where the light shielding plate 54 is formed, it is possible to arrange the end portion of the BM 45 outside by an amount of width d1. As viewed normal to the substrate plane, a distance between the end portion of the BM 45 in the region where the light shielding plate 54 is formed and the drain bus line 14 is set narrower than a distance between the end portion of the BM 45 in other region and the drain bus line 14.

Further, the light shielding plate 54 and the pixel electrode 16 are arranged in an overlapped manner. Further, with the provision of the light shielding plate 54, the influence of an electric capacitance which is generated between the drain bus line 14 and the pixel electrode 16 can be suppressed and hence, even when the pixel electrode 16 is arranged close to the drain bus line 14, a defective display attributed to crosstalk is hardly generated. On the other hand, when the pixel electrode 17 which is connected to the source electrode 22 due to capacitive coupling and the light shielding plate 54 are arranged to be overlapped to each other, a new electric capacitance is generated between the pixel electrode 17 and the light shielding plate 54 and hence, the light shielding plate 54 is not formed in the vicinity of the end portion of the pixel electrode 17 which faces the drain bus line 14 in an opposed manner. As a result of these arrangement and consideration, a distance between the end portion of the pixel electrode 16 which faces the drain bus line 14 in an opposed manner and the drain bus line 14 is set narrower than a distance between the end portion of the pixel electrode 17 which faces the drain bus line 14 in an opposed manner and the drain bus line 14 by an amount of a width d2. In this manner, according to this embodiment, with the provision of the light shielding plate 54, it is possible to enhance an aperture ratio of the pixel and hence, it is possible to acquire the liquid crystal display device having the high brightness.

Figure 3A:
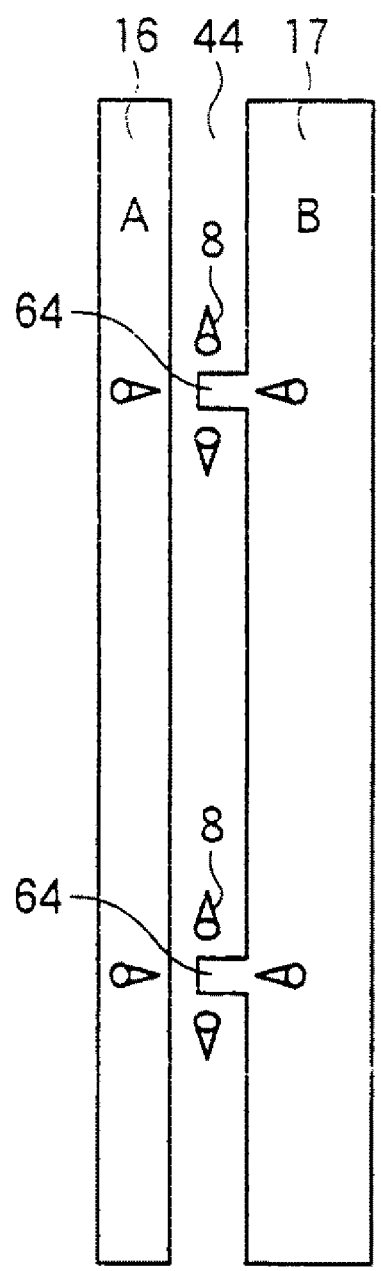
FIG. 3A and FIG. 3B are views showing the constitution of the vicinity of a slit 44 of the liquid crystal display device according to the first embodiment of the present invention.
Figure 3B:
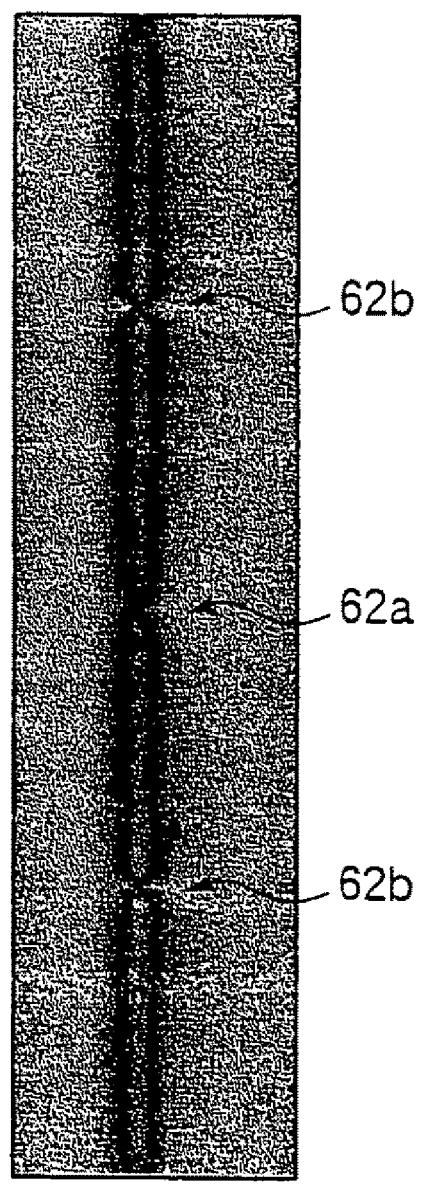

Next, the alignment of the liquid crystal in the region above the slit 44 of the liquid crystal display device according to this embodiment is explained. FIG. 3A shows the constitution in the vicinity of the slit 44 of the pixel (in FIG. 3A, two projecting portions 64 are formed). FIG. 3B shows a display state of the same region as FIG. 3A when the pixel is allowed to perform a white display. As shown in FIG. 3A and FIG. 3B, in the vicinity of the region where the projecting portion 64 which projects from the pixel electrode 17 as a singular point control part is formed, liquid crystal molecules 8 on the pixel electrodes 16, 17 are tilted in the direction toward the outside from the slit 44, while the liquid crystal molecules 8 on the slit 44 are tilted in the direction toward the projecting portion 64. Accordingly, in the regions where the projecting portion 64 is formed, singular points 62b (s=−1) are firmly formed respectively. Positions of the singular points 62b are neither changed even along with the different voltage applying histories nor moved along with the lapse of time. Between two singular points 62b, a singular point 62a (s=+1) is formed. Although a position of the singular point 62a may be changed along with the different voltage applying histories, for example, since a range within which the position is changed is limited to a span between two projecting portions 64, there exists no possibility that the display quality is largely degraded. The neighboring singular points 62b, 62b, are connected by two dark lines which respectively extend along the slit-44-side end portions of the pixel electrodes 16, 17.

Figure 4A:
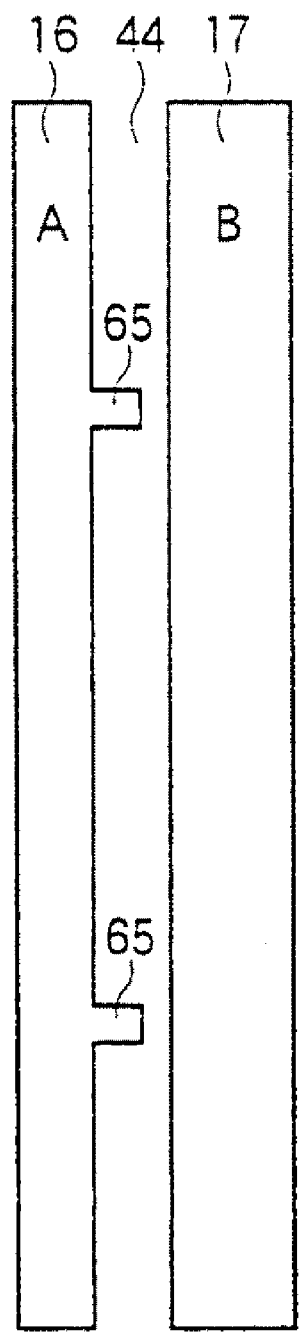
FIG. 4A and FIG. 4B are views showing a first modification of a singular point control part.
Figure 4B:
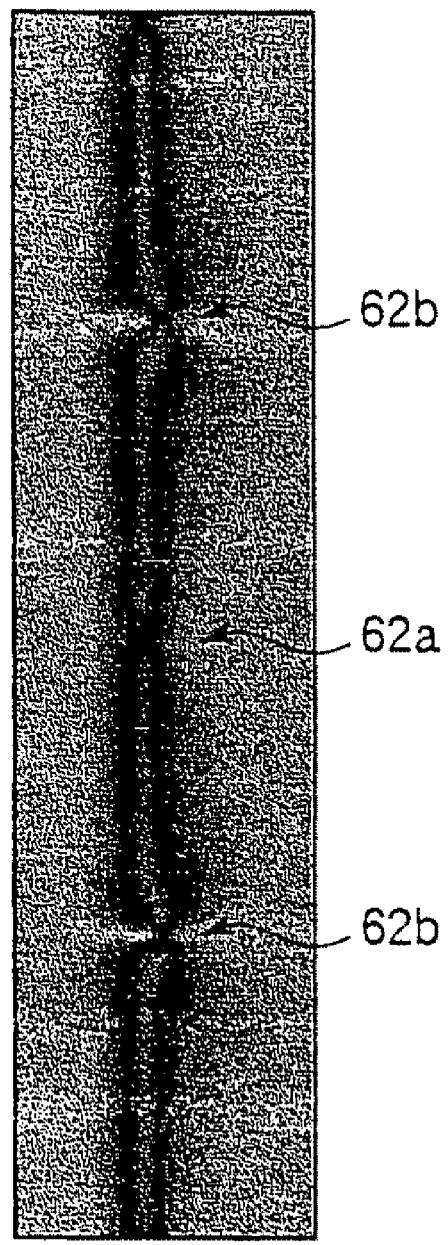

FIG. 4A shows a first modification of the singular point control parts. FIG. 4B shows a display state of the same region as FIG. 4A when the pixel is allowed to Perform a white display. As shown in FIG. 4A and FIG. 4B, the singular point control parts of the modification include projecting portions 65 formed on a slit-44-side end portion of the pixel electrode 16 of the sub pixel A. Also in this embodiment, singular points 62b are formed in regions where the projecting portions 65 are firmly formed, and a singular point 62a is formed between the singular points 62b.

Figure 5A:
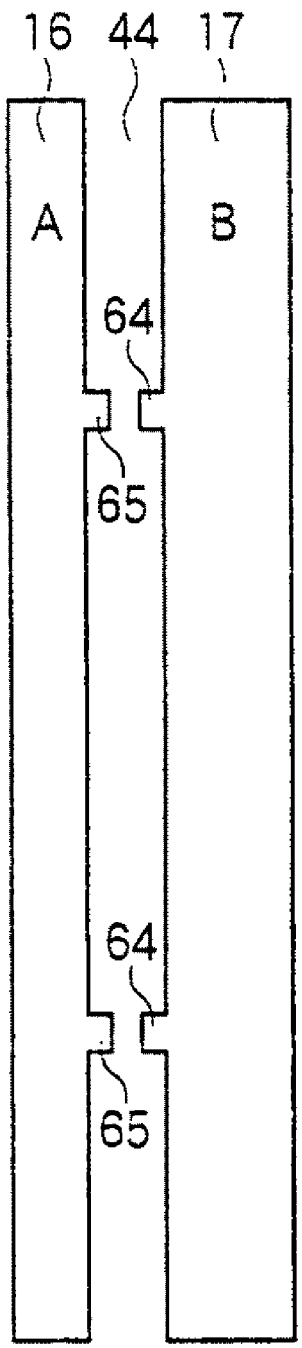
FIG. 5A and FIG. 5B are views showing a second modification of the singular point control part.
Figure 5B:
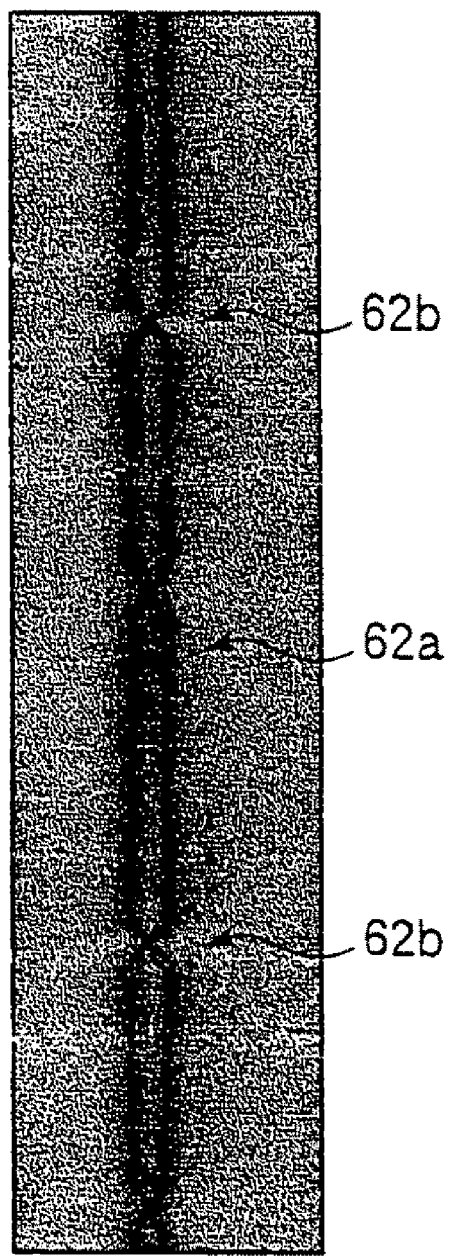

FIG. 5A shows a second modification of the singular point control parts. FIG. 5B shows a display state of the same region as FIG. 5A when the pixel is allowed to perform a white display. As shown in FIG. 5A and FIG. 5B, the singular point control parts of the modification include projecting portions 64 formed on a slit-44-side end portion of the pixel electrode 17 and projecting portions 65 formed on a slit-44-side end portion of the pixel electrode 16. The projecting portions 64 and the projecting portions 65 are arranged such that respective distal end portions thereof face each other in an opposed manner with a given gap therebetween. Also in this modification, singular points 62b are firmly formed in regions where the projecting portions 64, 65 are formed, and a singular point, 62a is formed between the singular points 62b.

Figure 6A:
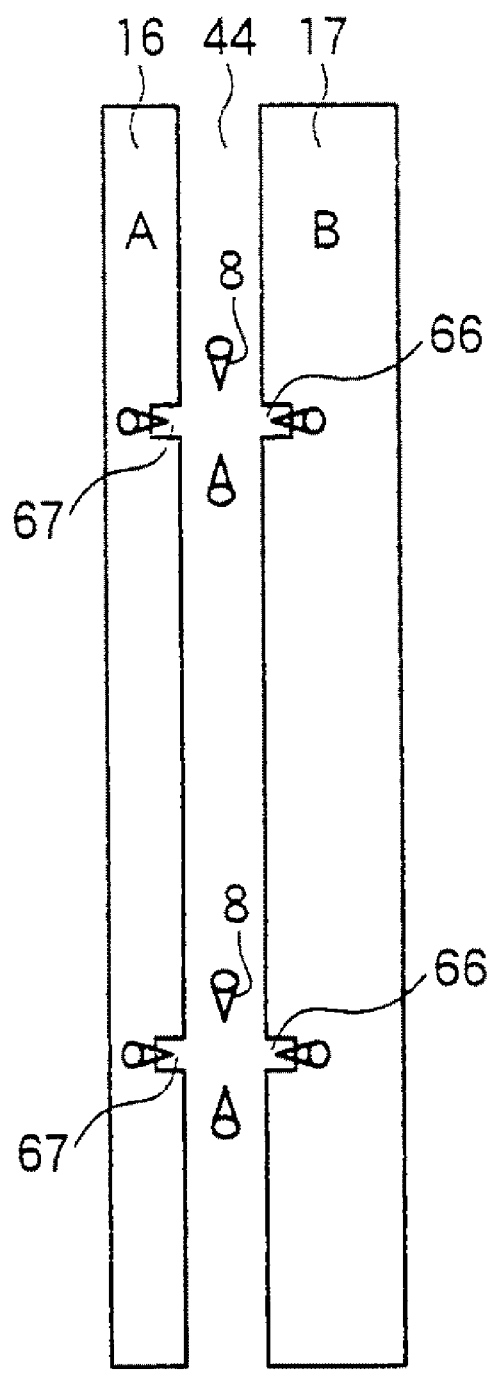
FIG. 6A and FIG. 6B are views showing a third modification of the singular point control part.
Figure 6B:
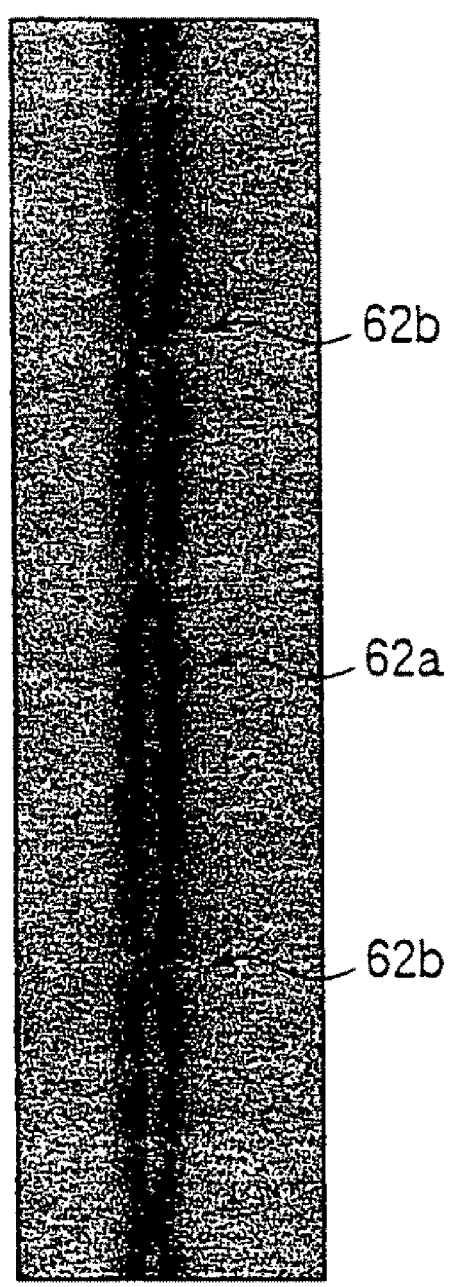

FIG. 6A shows a third modification of the singular point control part. FIG. 6B shows a display state of the same region as FIG. 6A when the pixel is allowed to perform a white display. As shown in FIG. 6A and FIG. 6B, the singular point control part of this modification includes recessed portions 66 which are notched in a rectangular shape in a slit-44-side end portion of the pixel electrode 17 in a substrate plane, and recessed portions 67 which are notched in the same manner in a slit-44-side end portion of the pixel electrode 16 in a substrate plane. The recessed portions 66, 67 are arranged at positions where the recessed portions 66, 67 face each other in an opposed manner. In this modification, in the vicinity of regions where the recessed portions 66, 67 are formed, liquid crystal molecules 8 on the pixel electrodes 16, 17 are tilted in the direction toward the outside from the slit 44, while the liquid crystal molecules 8 on the slit 44 are tilted in the direction parallel to the extending direction of the slit 44 as well as in the direction toward the outside from the recessed portions 66, 67. Accordingly, in the regions where the recessed portions 66, 67 are formed, singular points 62a (s=+1) are firmly formed. Positions of the singular points 62a are neither changed even along with the difference voltage applying histories nor moved along with the lapse of time. Between two singular points 62a, a singular point 62b (s=−1) is formed. Although a position of the singular point 62b may be changed along with the different voltage applying histories, for example, since a range within which the position is changed is limited to a span between two singular points 62a, there exists no possibility that the display quality is largely degraded.

Figure 7A:
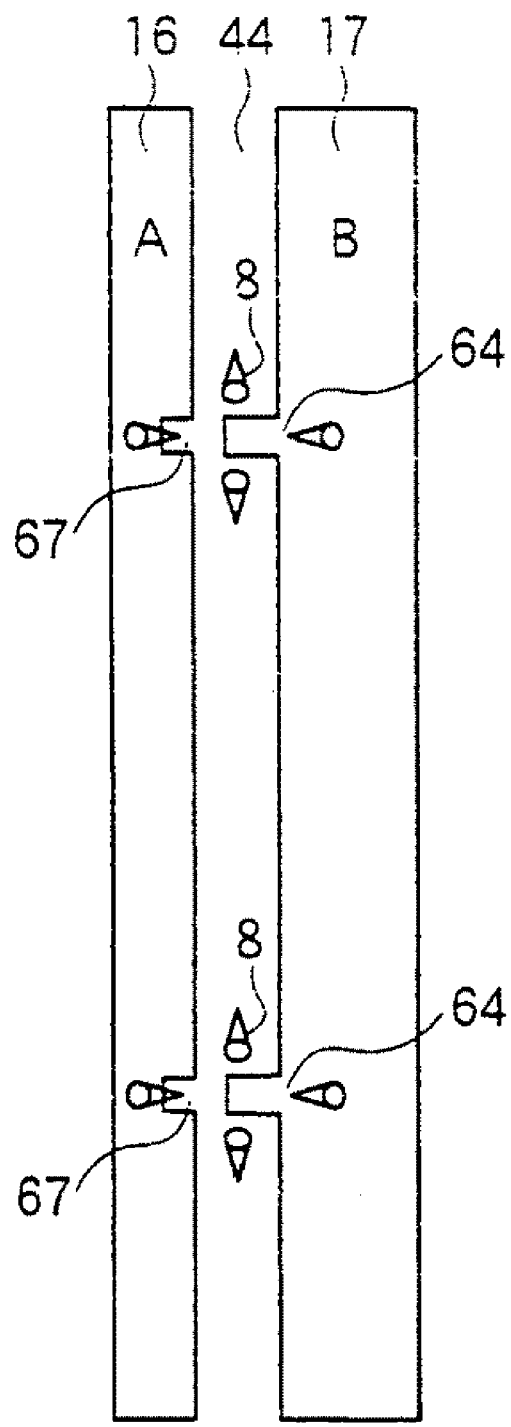
FIG. 7A and FIG. 7B are views showing a fourth modification of the singular point control part.
Figure 7B:
Figure 8A:
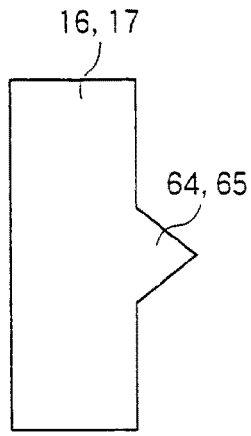
FIG. 8A to FIG. 8F are views showing modifications of shapes of a projecting portion and a recessed portion.
Figure 8B:
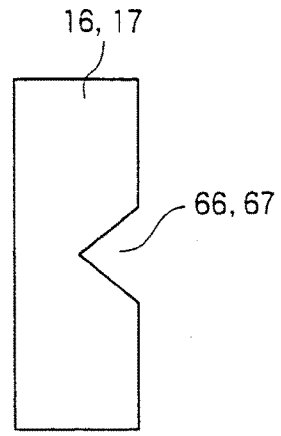
Figure 8C:
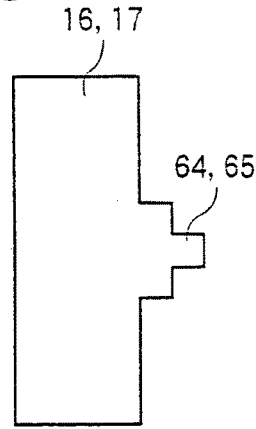
Figure 8D:
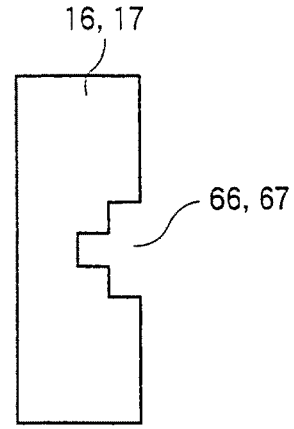
Figure 8E:
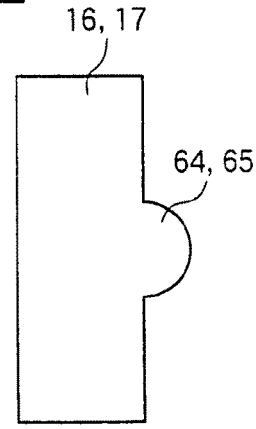
Figure 8F:
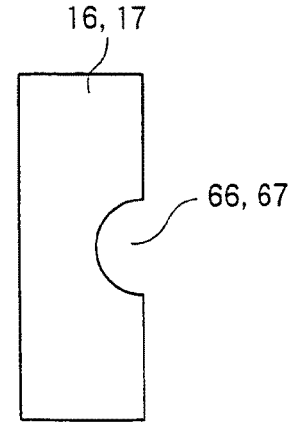

FIG. 7A shows a fourth modification of the singular point control parts. FIG. 7B shows a display state of the same region as FIG. 7A when the pixel is allowed to perform a white display. As shown in FIG. 7A and FIG. 7B, the singular point control parts of the modification include projecting portions 64 formed on a slit-44-side end portion of the pixel electrode 17 and recessed portions 67 formed on a slit-44-side end portion of the pixel electrode 16. The projecting portions 64 and the recessed portions 67 are arranged such that respective distal end portions thereof face each other in an opposed manner. In this modification, in the vicinity of regions where the projecting portions 64 and the recessed portions are formed, liquid crystal molecules 8 on the pixel electrodes 16, 17 are tilted in the direction toward the outside from the slit 44, while the liquid crystal molecules 8 on the slit 44 are tilted in the direction toward the outside from the projecting portions 64. Accordingly, in the regions where the projecting portions 64 and the recessed portions 67 are formed, the singular points 62b are firmly formed. Between two singular points 62b, a singular point 62a is formed.

To compare the constitutions shown in FIG. 3A to FIG. 7B, the constitution which forms the projecting portions 64 on the pixel electrode 17 of the sub pixel B as shown in FIG. 3A and FIG. 3B is relatively excellent in view of the stability of the singular points and the high optical transmissivity at the time of applying a voltage. That is, when the voltage applied to the liquid crystal layer differs for every sub pixel, it is desirable that the projecting portions are formed on the pixel electrode of the sub pixel where a magnitude of a voltage applied to the liquid crystal layer is small.

By forming the singular point control parts as shown in FIG. 3A to FIG. 7B, the singular points 62b (or 62a) are firmly formed, and the singular point 62a (or 62b) is formed between singular points 62b (or 62a). Accordingly, the positions where the singular points 62a, 62b are formed can be substantially fixed spatially and for a long period and hence, even after passing the different voltage applying histories, there is no possibility that the positions of the singular points 62a, 62b are changed whereby a phenomenon that a display differs depending on the screen viewing direction can be obviated. Further, since the singular points 62b (or 62a) are firmly formed, even when the alignment of the liquid crystal is disturbed due to the local application of pressure to a display screen by finger pushing or the like and the alignment of the liquid crystal is disturbed, it is possible to easily restore the original alignment state. In this manner, according to the above-mentioned embodiments, it is possible to obtain the liquid crystal display device which exhibits the favorable display characteristics.

Here, shapes of the projecting portions 64, 65 and the recessed portions 66, 67 are not limited to the rectangular shape shown in FIG. 3A to FIG. 7B. FIG. 8A to FIG. 8F show modification of the shapes of the projecting portions 64, 65 and the recessed portions 66, 67. In an example shown in FIG. 8A, the projecting portion 64 and/or 65 has a triangular shape. In an example shown in FIG. 8B, the recessed portion 66 and/or 67 has a triangular shape. In an example shown in FIG. 8C, the projecting portion 64 and/or 65 has a step-like shape. In an example shown in FIG. 8D, the recessed portion 66 and/or 67 has a step-like shape. In an example shown in FIG. 8E, the projecting portion 64 and/or 65 has a semicircular shape. In an example shown in FIG. 8F, the recessed portion 66 and/or 67 has a semicircular shape. The projecting portions 64, and the recessed portions 66, 67 may be formed in various shapes besides the above-mentioned shapes.

Further, in the modifications shown in FIG. 5A to FIG. 7B, the projecting portions 64 or the recessed portions 66 which are formed on or in the pixel electrode 17 and the projecting portions 65 or the recessed portions 67 which are formed on or in the pixel electrode 16 are arranged at positions where these portions face each other in an opposed manner. However, in this embodiment, it is possible to modify such arrangements and adopt arrangements in which the positions of the projecting portions 64 or the recessed portions 66 and the positions of the projecting portions 65 or the recessed portions 67 are displaced from each other. It is needless to say that the positions and the combinations of the projecting portions 64 or the recessed portions 66 and the projecting portions 65 or the recessed portions 67 are not limited to the examples shown in FIG. 3A to FIG. 7B and various modifications can be made. For example, by alternatively arranging the projecting portions 64, 65 shown in FIG. 5A and FIG. 5B with the recessed portions 66, 67 shown in FIG. 6A and FIG. 6B, both positions where the singular points 62a (s=+1), 62b (s=−1) are formed are fixed.

Second Embodiment

Figure 9:
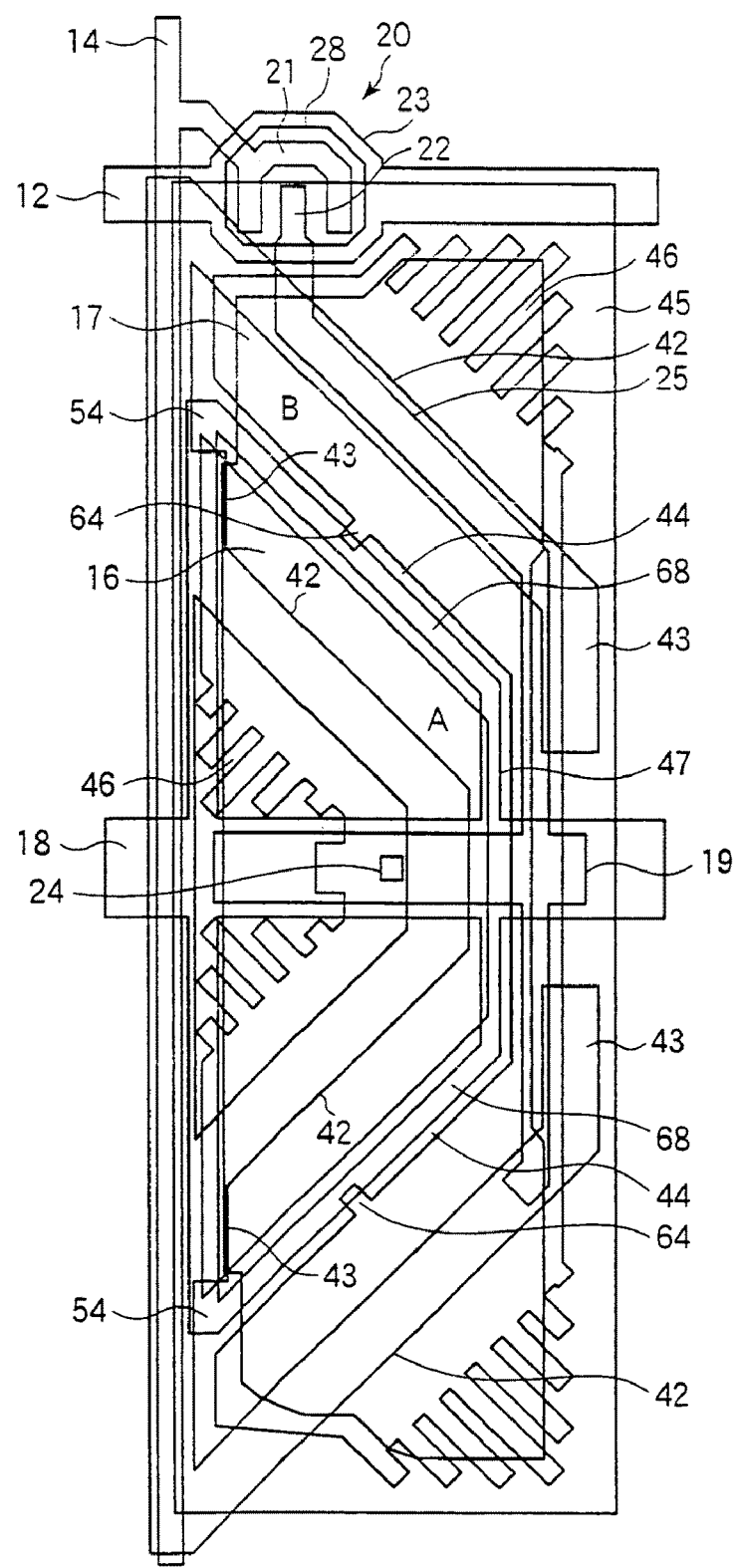
FIG. 9 is a view showing the constitution of one pixel of a liquid crystal display device according to a second embodiment of the present invention.
Figure 10:
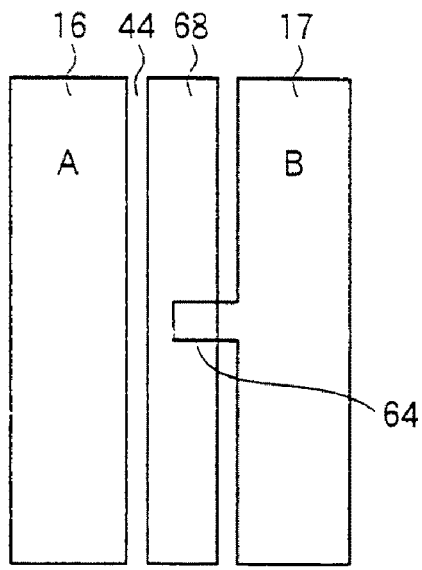
FIG. 10 is a view showing the constitution of the vicinity of a slit 44 of the liquid crystal display device according to the second embodiment of the present invention.

Next, a liquid crystal display device according to the second embodiment of the present invention is explained in conjunction with FIG. 9 to FIG. 12. FIG. 9 shows the constitution of one pixel of the liquid crystal display device according to this embodiment, and FIG. 10 shows the constitution of the vicinity of a slit 44 of the liquid crystal display device according to this embodiment. As shown in FIG. 9 and FIG. 10, in comparison with the first embodiment, this embodiment is characterized in that an auxiliary electrode 68 extends in the substantially same direction as the extending direction of the slits 44, 47 is formed on the slits 44, 47 in an overlapped manner. The auxiliary electrode 68 is formed on the same layer as the storage capacitor bus line 18 and is electrically connected with the storage capacitor bus line 18 and is branched from the storage capacitor bus line 18, for example. Further, the auxiliary electrode 68 is also connected with a light shielding plate 54 which is formed on an end portion which faces a drain bus line 14 of a pixel electrode 16 in an opposed manner. When a pixel electrode 17 which is connected with the source electrode 22 due to capacitive coupling and the auxiliary electrode are arranged in an overlapped manner, a new electric capacitance is generated between the pixel electrode 17 and the auxiliary electrode 68 and hence, the auxiliary electrode 68 is formed in a state that the auxiliary electrode 68 is not overlapped to the pixel electrode 17.

The auxiliary electrode 68 is held at the same potential (common potential) as the storage capacitor bus line 18 and, the common electrode. Accordingly, even when a given voltage is applied to the liquid crystal layers of the sub pixels A, B respectively, the voltage is not applied to the liquid crystal layer in the vicinity of the region in which the auxiliary electrode 68 is formed and hence, the liquid crystal molecules 8 in the region hold the alignment substantially normal to the substrate plane. By forming the auxiliary electrode 68 on the slits 44, 47 in an overlapped manner, the liquid crystal molecules 8 on the slits 44, 47 are not tilted and hence, there is no possibility that singular points are formed. Accordingly, degradation of the display quality attributed to the fact that the positions of the singular points are not fixed is not generated basically and hence, it is possible to obtain a liquid crystal display device having favorable display quality.

The slit 44 arranged between the pixel electrodes 16, and the auxiliary electrode 68 is formed using a photolithography method. When a relative positional displacement takes place between the slit 44 and the auxiliary electrode 68 due to the patterning displacement or the like, there may be a case that the auxiliary electrode 68 is displaced from the center portion of the slit 44. In such a case, when the voltage is applied to the liquid crystal layer in the sub pixels A and B, the liquid crystal molecules 8 on the slits 44, 47 are tilted and hence, the singular points are formed. Accordingly, in this embodiment, to fix the singular point even when the singular points are formed, a projecting portion 64 is mounted on an slit-44-side end portion of the pixel electrode 17 of the sub pixel B. Accordingly, even when a relative positional displacement is generated between the slit 44 and the auxiliary electrode 68, it is possible to obtain a liquid crystal display device having favorable display quality and hence, a yield rate in manufacturing the liquid crystal display device is enhanced.

Figure 11:
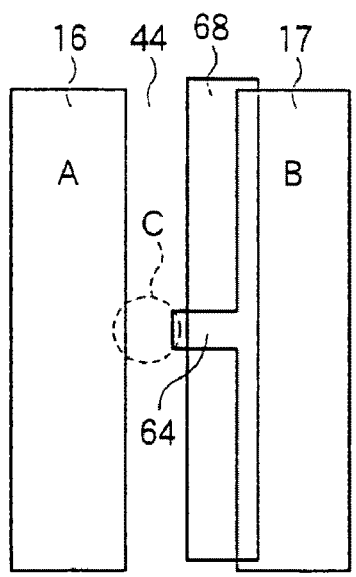
FIG. 11 is a view showing the constitution of the vicinity of the slit 44.

However, in the constitution provided with the projecting portion 64, when the positional displacement shown in FIG. 11 is generated between the slit 44 and the auxiliary electrode 68, for example, a region C where the auxiliary electrode 68 does not exist is formed between the distal end portion of the projecting portion 64 and the pixel electrode 16. Since the auxiliary electrode 68 does not exist in the region C and a distance between the pixel electrodes 16, 17 is relatively small, when a display screen is locally pressed by pushing using a finger or the like, there arises a drawback that the alignments of the liquid crystal in the sub pixels A, B are connected thus giving rise to a drawback that the defective alignment occurs.

Figure 12:
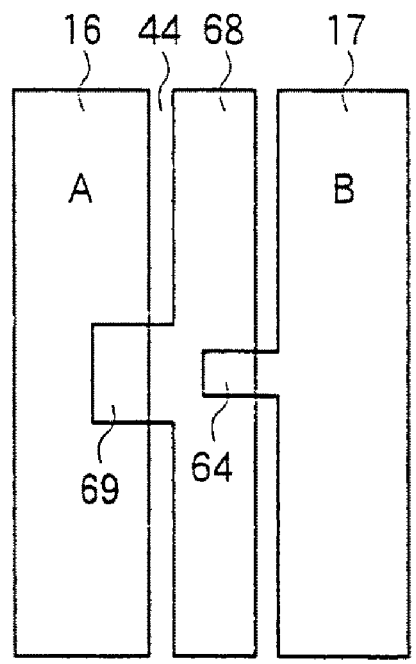
FIG. 12 is a view showing a modification of the liquid crystal display device according to the second embodiment of the present invention.
Figure 13:
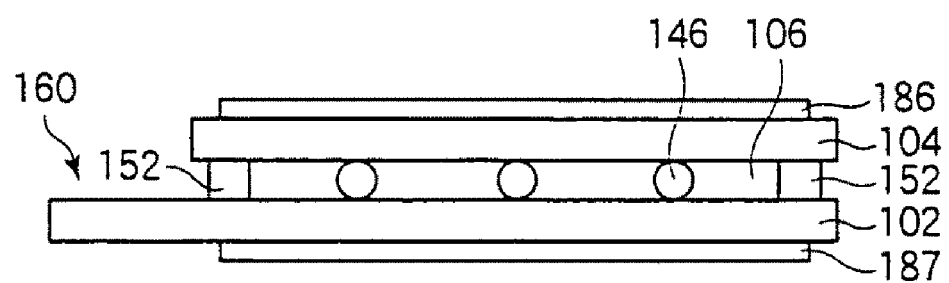
FIG. 13 is a view showing a schematic cross-sectional constitution of the conventional liquid crystal display device.
Figure 14:
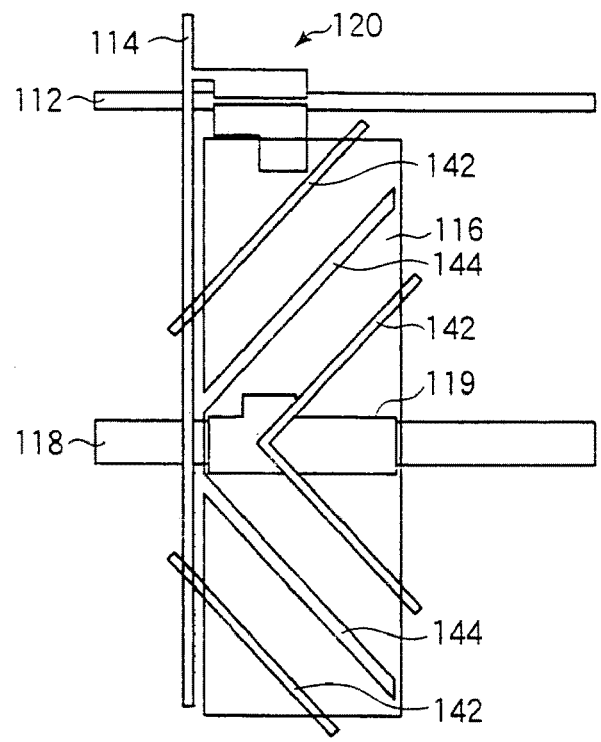
FIG. 14 is a view showing the constitution of one pixel of the conventional liquid crystal display device.
Figure 15A:
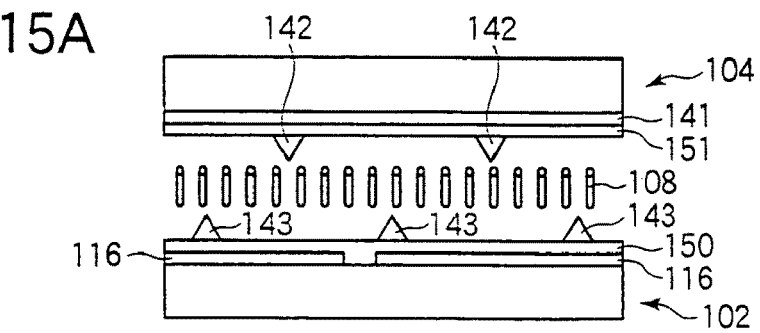
FIG. 15A and FIG. 15B are views for explaining the alignment regulating structure.
Figure 15B:
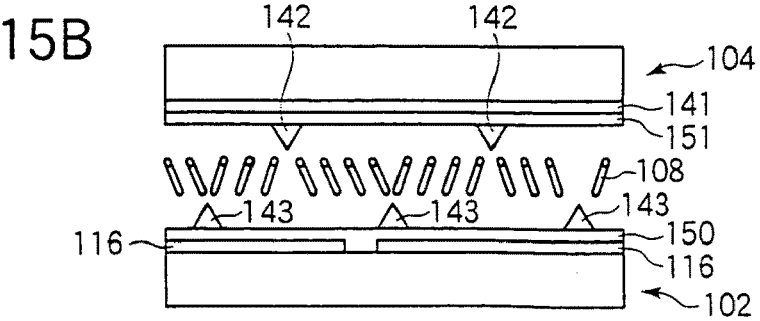
Figure 16:
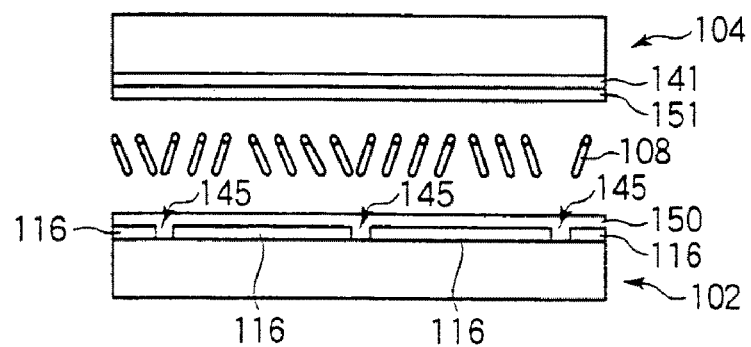
FIG. 16 is a view for explaining the alignment regulating structure.
Figure 17:
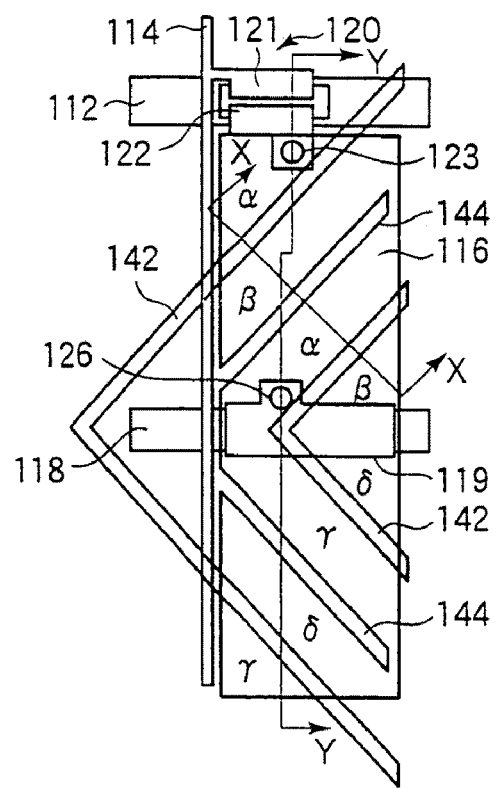
FIG. 17 is a view showing the constitution of one pixel of the conventional liquid crystal display device.
Figure 18:
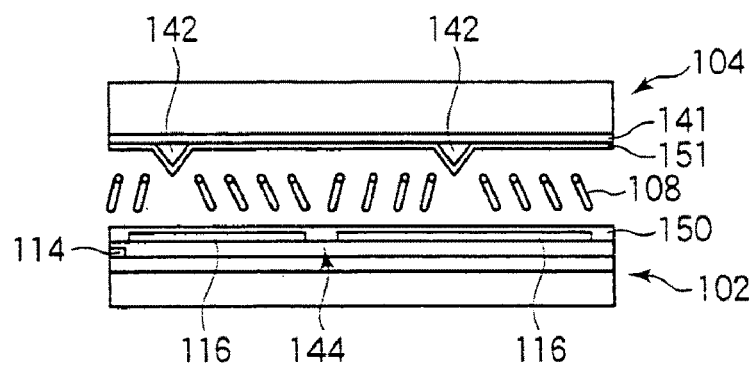
FIG. 18 is a cross-sectional view showing the constitution of the conventional liquid crystal display device.
Figure 19:
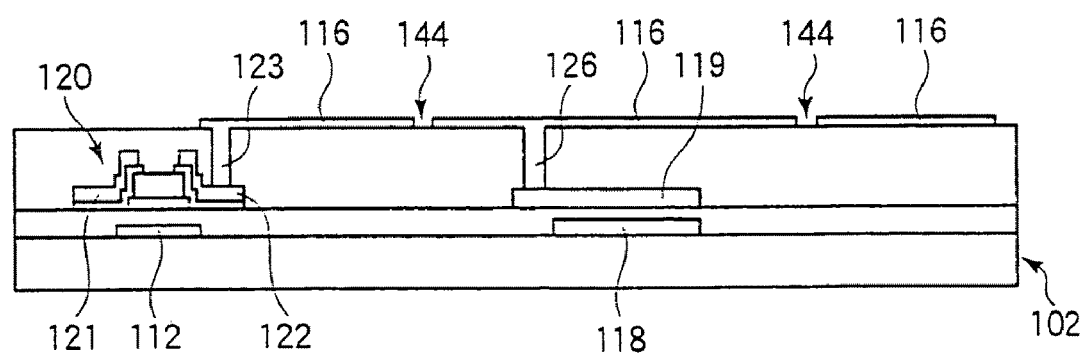
FIG. 19 is a cross-sectional view showing the constitution of the conventional liquid crystal display device.
Figure 20:
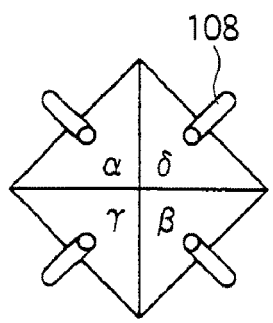
FIG. 20 is a view schematically showing alignment azimuths of liquid crystal molecules in respective alignment regions α to δ and an area ratio among the respective alignment regions α to δ in one pixel.
Figure 21:
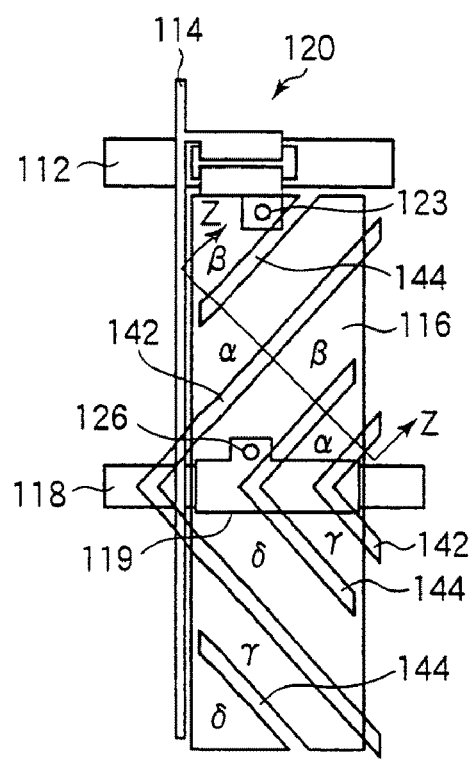
FIG. 21 is a view showing the constitution of one pixel of the conventional liquid crystal display device.
Figure 22:
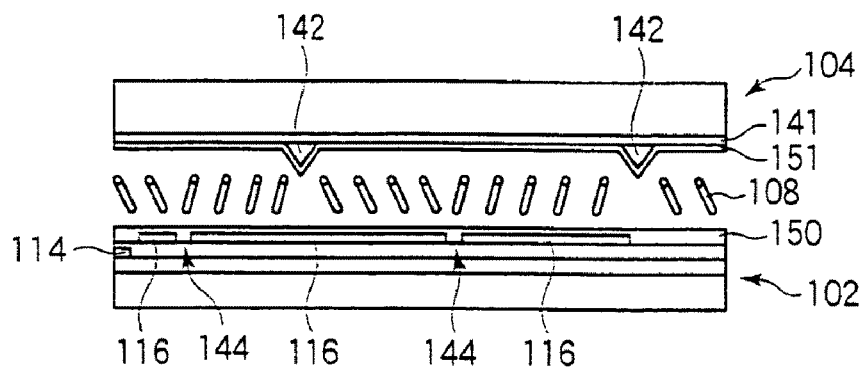
FIG. 22 is a cross-sectional view showing the constitution of the conventional liquid crystal display device.
Figure 23:
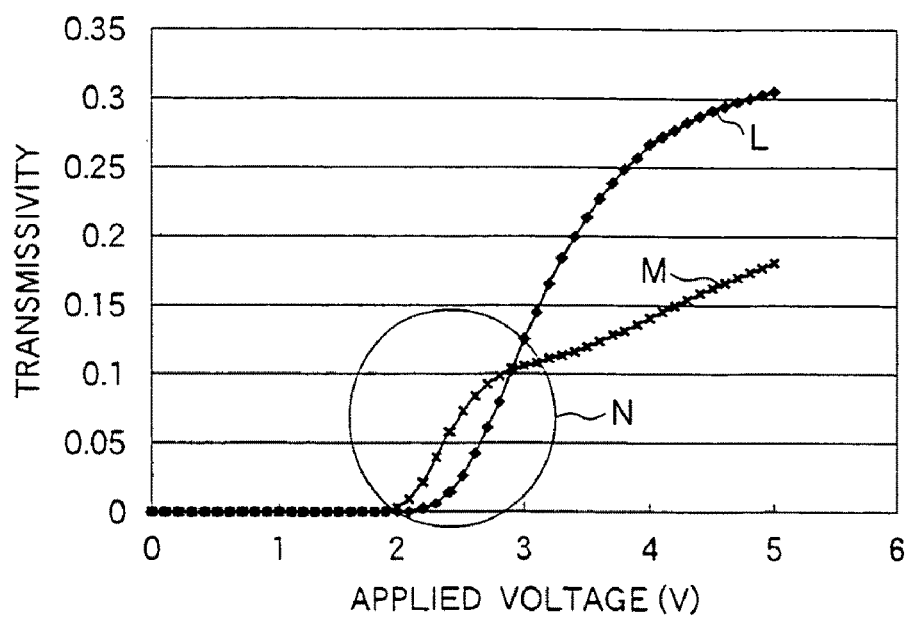
FIG. 23 is a graph showing the T-V characteristics of a conventional VA mode liquid crystal display device.
Figure 26:
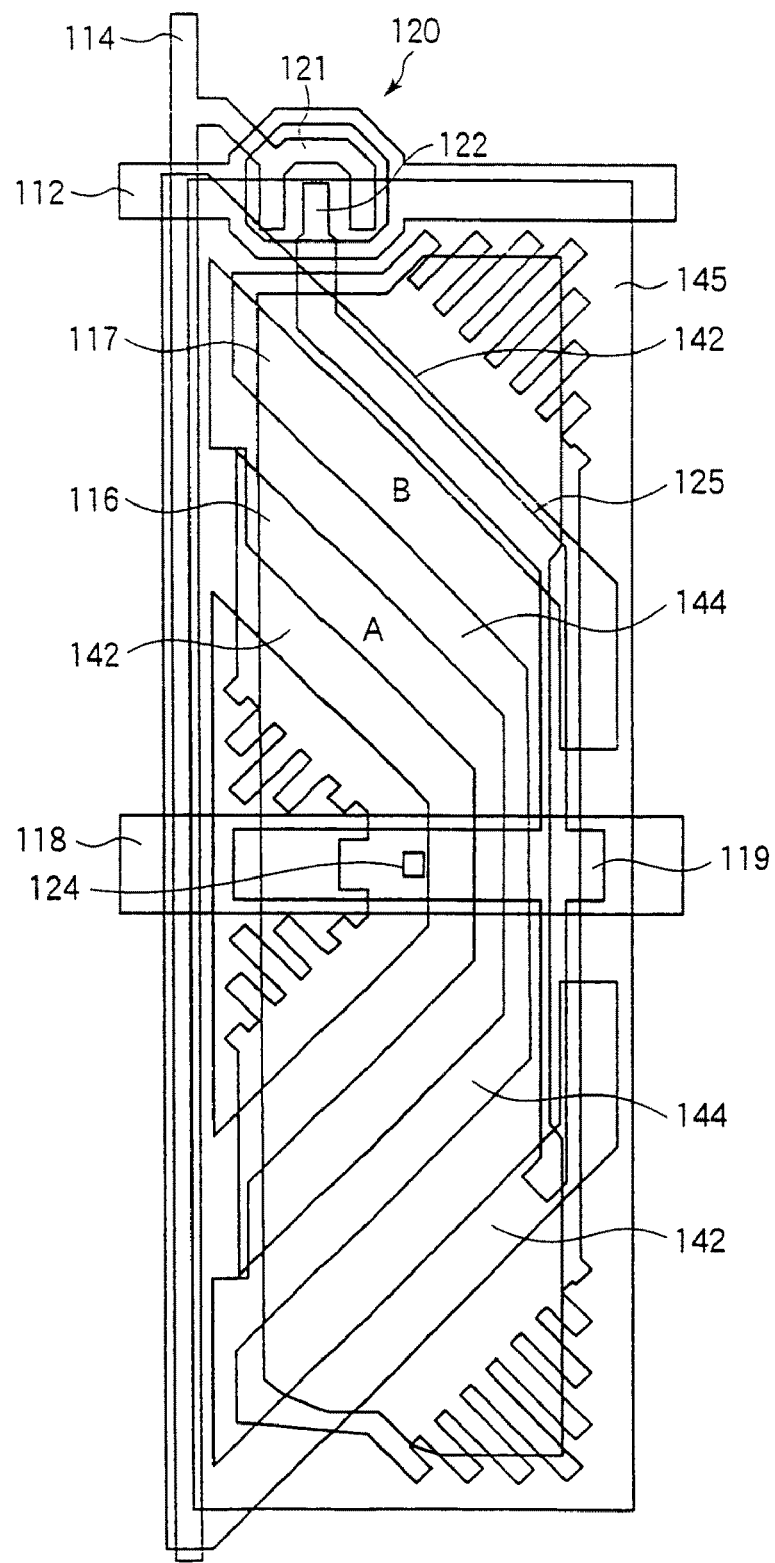
FIG. 26 is a view showing the constitution of one pixel of a conventional MVA method liquid crystal display device using a capacitive coupling HT method.
Figure 27:
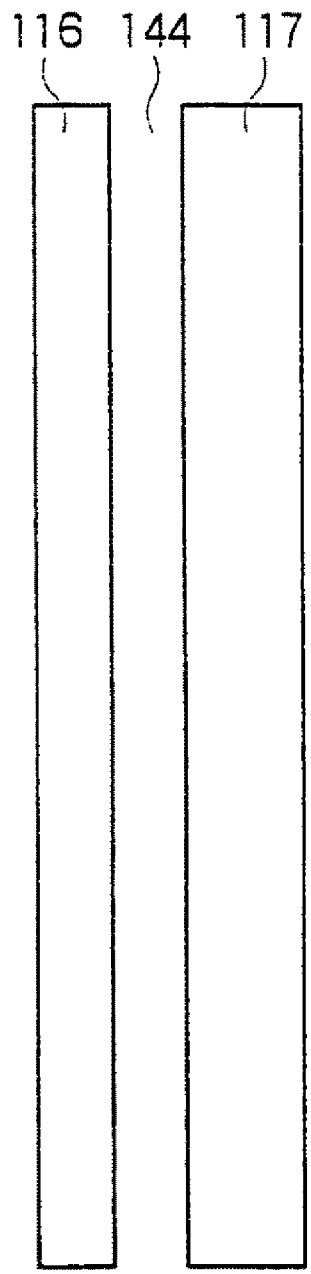
FIG. 27 is a view showing the constitution of a pixel electrode in the vicinity of a slit.
Figure 28:
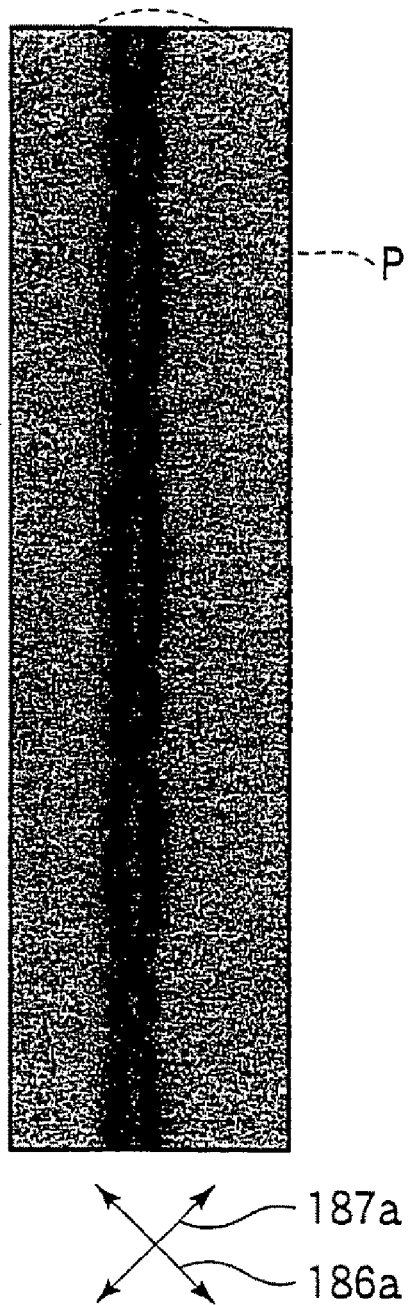
FIG. 28 is a view showing a display state of the same region as FIG. 27 when a white display is performed by the pixel.
Figure 29:
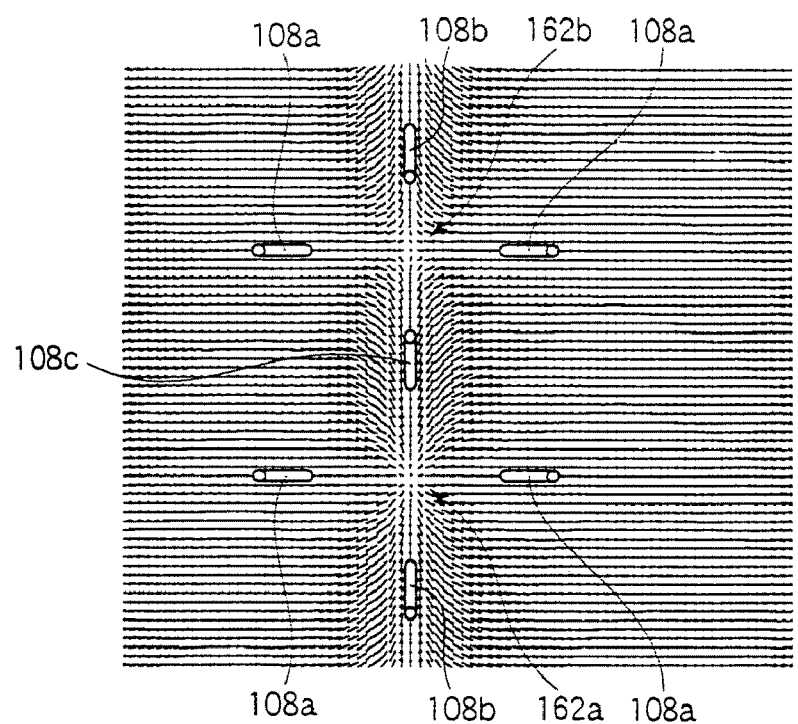
FIG. 29 is a view schematically showing alignment of liquid crystal molecules in a region inside a circle P in FIG. 28.

FIG. 12 shows a modification of the auxiliary electrode 68 which can solve the above-mentioned drawback. As shown in FIG. 12, the auxiliary electrode 68 has a protruding portion 69 which projects in the same direction as the projection direction of the projecting portion 64 in the region corresponding to the projecting portion 64 of the pixel electrode 17. The protruding portion 69 is formed to have a width larger than a width of the projecting portion 64. With the provision of the protruding portion 69, even when the positional displacement shown in FIG. 11 is generated between the slit 44 and the auxiliary electrode 68, a region where the auxiliary electrodes 68 does not exist is not formed between the distal end portion of the projecting portion 64 and the pixel electrode 16. Accordingly, the defective alignment of the liquid display hardly occurs and hence, it is possible to obtain the liquid crystal display device having a favorable display quality. Here, when the projecting portions 64, 65 which face each other are formed as shown in FIG. 5A and FIG. 5B, the protruding portion 69 is formed on both sides of the auxiliary electrode 68.

The present invention is not limited to the above-mentioned embodiment and various modifications can be made.

For example, although a transmissive liquid crystal display device has been explained as an example in the above-mentioned embodiments, the present invention is not limited to such a display device and is applicable to other liquid crystal display device such as a reflective liquid crystal display device or a transflective liquid crystal display device.

Further, in the above-mentioned embodiment, a liquid crystal display device in which a pixel region includes two sub pixels has been explained as an example, the present invention is not limited to such a display device. That is, the present invention is applicable to a liquid crystal display device in which a pixel region includes three or more sub pixels.

Further, although a liquid crystal display device which adopts a capacitance coupling HT method in which the voltage applied to the liquid crystal layer differs for every each sub pixel has been explained in the above-mentioned embodiments, the present invention is not limited to such a display device. That is, the present invention is applicable to a general MVA type liquid crystal display device in which voltages which are applied to the liquid crystal layers in a plurality of sub pixels within one pixel which is divided using the slit are substantially set equal with each other.

What is claimed is:

1. A liquid crystal display device comprising:
   a pair of substrates which are arranged to face each other in an opposed manner;
   a plurality of pixel regions, each pixel region including a first sub pixel having a first pixel electrode on one substrate and a second sub pixel having a second pixel electrode on one substrate;
   a slit formed between the first and second pixel electrodes;
   a portion which includes a projecting portion and/or a recessed portion which is/are formed on an end portion of the first and/or second pixel electrode on the slit-side and controls singular points of the liquid crystal,
   wherein said portion is aligned in a direction perpendicular to a main portion of said slit and substantially angled relative to gate and source lines of the liquid crystal display device.

2. The liquid crystal display device of claim 1, wherein the portion comprises a projecting portion, wherein the projecting portion is formed on the end portion of the second electrode on the slit side.

3. The liquid crystal display device of claim 1, further comprising:
   a plurality of gate bus lines which are formed on one of the substrates;
   a plurality of drain bus lines which are formed in a state that the drain bus lines intersect gate bus lines via an insulating film;
   a transistor which includes a gate electrode that is electrically connected with one of the gate bus lines, a drain electrode electrically connected to one of the drain bus lines, and a source electrode electrically connected to the first pixel electrode; and
   a control capacitance part comprising a control capacitance electrode which is electrically connected with the source electrode and is arranged to face at least a portion of the second pixel electrode via an insulating film, and generates capacitive coupling with the source electrode and the second pixel electrode.

4. The liquid crystal display device of claim 3, further comprising a light shielding plate arranged in a vicinity of the end portion of the first electrode which faces a drain bus line on one substrate and shields the vicinity of the end portion from light.

5. The liquid crystal display device of claim 1, further comprising a common electrode on another substrate, and an auxiliary electrode on said one substrate, wherein the auxiliary electrode overlaps the slit and substantially holds a potential substantially equal to a potential of the common electrode.

6. The liquid crystal display device of claim 5, wherein the auxiliary electrode includes a protruding section which protrudes in the same direction as the projecting direction of the projecting portion in a region corresponding to the projecting portion.

7. The liquid crystal display device of claim 1, wherein said first pixel electrode and said second pixel electrode are in a given pixel region, and wherein one of said first and second pixel electrodes is electrically connected to a TFT of the pixel region and the other of the first and second pixel electrodes is in a floating state.

8. The liquid crystal display device of claim 1, wherein said portion comprises a singular point control part.

9. The liquid crystal display device of claim 1, wherein the first pixel electrode is separated from the second pixel electrode.

* * * * *